United States Patent
Fanizza et al.

(10) Patent No.: US 12,134,284 B2
(45) Date of Patent: Nov. 5, 2024

(54) AERODYNAMIC COVER FOR A VEHICLE WHEEL, ATTACHMENT SYSTEM FOR THE AERODYNAMIC COVER TO THE VEHICLE WHEEL, AND VEHICLE WHEEL HAVING SUCH AN AERODYNAMIC COVER AND ATTACHMENT SYSTEM

(71) Applicant: Maxion Wheels U.S.A. LLC, Novi, MI (US)

(72) Inventors: Iosef Fanizza, Königswinter (DE); Fernando Mitsuyassu, Limeira-SP (BR)

(73) Assignee: Maxion Wheels U.S.A. LLC, Novi, MI (US)

( * ) Notice: Subject to any disclaimer, the term of this patent is extended or adjusted under 35 U.S.C. 154(b) by 273 days.

(21) Appl. No.: 17/764,681

(22) PCT Filed: Oct. 6, 2020

(86) PCT No.: PCT/US2020/054353
§ 371 (c)(1),
(2) Date: Mar. 29, 2022

(87) PCT Pub. No.: WO2021/071807
PCT Pub. Date: Apr. 15, 2021

(65) Prior Publication Data
US 2022/0363091 A1    Nov. 17, 2022

Related U.S. Application Data

(60) Provisional application No. 62/911,478, filed on Oct. 7, 2019.

(51) Int. Cl.
*B60B 7/04*    (2006.01)
*B60B 7/06*    (2006.01)
*B60B 7/12*    (2006.01)

(52) U.S. Cl.
CPC ............... *B60B 7/04* (2013.01); *B60B 7/063* (2013.01); *B60B 7/068* (2013.01); *B60B 7/12* (2013.01); *B60B 2900/1216* (2013.01)

(58) Field of Classification Search
CPC ........... B60B 7/04; B60B 7/063; B60B 7/068; B60B 7/12
See application file for complete search history.

(56) References Cited

U.S. PATENT DOCUMENTS

| | | | | |
|---|---|---|---|---|
| 4,946,228 A | * | 8/1990 | Hsu ........................... | B60B 7/14 301/108.4 |
| 5,152,584 A | * | 10/1992 | Maxwell, Jr. ............. | B60B 7/04 301/37.26 |

(Continued)

FOREIGN PATENT DOCUMENTS

| | | |
|---|---|---|
| JP | S5725001 U | 2/1982 |
| JP | 200025401 A | 1/2000 |

(Continued)

OTHER PUBLICATIONS

Japanese Notice of Reasons for Rejection, Application No. 2022-520175, dated Apr. 2, 2024.

(Continued)

*Primary Examiner* — Kip T Kotter
(74) *Attorney, Agent, or Firm* — MacMillan, Sobanski & Todd, LLC

(57) ABSTRACT

A vehicle wheel comprises a wheel disc, wheel rim, and wheel axis. A first cover spans between the rim and a hub portion of the disc. An axial portion of the first cover extends substantially along the axis. A plurality of first vents in the axial portion are arrayed circumferentially about the axis. Tabs extend perpendicular to the axial portion at each of the first vents. A second cover is secured to the rim and extends radially inward from the rim in a direction perpendicular to the axis. A plurality of second vents are in the second cover (Continued)

and arrayed circumferentially about the axis. The first and second covers are on opposite sides of the wheel. Each of the first and second covers has a greater extent in a radial direction perpendicular to the axis than in an axial direction parallel to the axis.

20 Claims, 18 Drawing Sheets

(56) References Cited

U.S. PATENT DOCUMENTS

| | | | | |
|---|---|---|---|---|
| 5,324,099 | A | * | 6/1994 | Fitzhugh ................. B60B 7/068 |
| | | | | 301/6.3 |
| 5,542,750 | A | * | 8/1996 | FitzGerald ............... B60B 7/14 |
| | | | | 301/108.4 |
| 6,341,825 | B1 | | 1/2002 | Inoue et al. |
| 6,425,640 | B1 | | 7/2002 | Hussaini |
| 9,561,687 | B2 | * | 2/2017 | Polka ...................... B60B 7/068 |
| 2003/0168907 | A1 | * | 9/2003 | Hsu ......................... B60B 7/04 |
| | | | | 301/37.371 |
| 2009/0302669 | A1 | | 12/2009 | Yee et al. |
| 2012/0043803 | A1 | * | 2/2012 | Grill ..................... B60B 7/0013 |
| | | | | 301/37.26 |
| 2017/0157979 | A1 | | 6/2017 | Polka et al. |
| 2019/0001746 | A1 | | 1/2019 | Ordonez et al. |
| 2019/0225011 | A1 | | 7/2019 | Wang |

FOREIGN PATENT DOCUMENTS

| | | | |
|---|---|---|---|
| JP | 200951248 A | | 3/2009 |
| KR | 200148091 Y1 | * | 6/1999 |
| WO | 2004030944 A1 | | 4/2004 |
| WO | 2013009729 A1 | | 1/2013 |
| WO | WO-2019060173 A1 | * | 3/2019 ............... B60B 7/04 |

OTHER PUBLICATIONS

European Communication pursuant to Rules 70(2) and 70a(2) EPC, Application No. 20874463.1, dated Nov. 10, 2023.
International Search Report and Written Opinion, Application No. PCT/US2020/054353, dated Jan. 20, 2021.

* cited by examiner

AERODYNAMIC COVER FOR A VEHICLE WHEEL, ATTACHMENT SYSTEM FOR THE AERODYNAMIC COVER TO THE VEHICLE WHEEL, AND VEHICLE WHEEL HAVING SUCH AN AERODYNAMIC COVER AND ATTACHMENT SYSTEM

BACKGROUND OF THE INVENTION

The present invention relates generally to vehicle wheels and in particular to an aerodynamic cover for a vehicle wheel, an attachment system to attach the aerodynamic cover to the vehicle wheel, and a vehicle wheel having such an aerodynamic cover and attachment system.

Wheels for automotive vehicles are commonly secured to the vehicle by lug nuts. The lug nuts are screwed or otherwise tightened on to corresponding lug bolts. The lug bolts extend outward from the vehicle and through a wheel disc of the wheel. As such, the lug nuts are exposed on an outboard side of the wheel that is away from the vehicle. Also, the lug bolts typically extend away from the vehicle beyond the lug nuts. The lug nuts and bolts extending outward from the wheel disc and being exposed causes undesirable air resistance—i.e., drag—when the vehicle is driven. For example, the air resistance caused by the lug nuts and bolts reduces fuel economy for the vehicle. Thus, it would be desirable to reduce air resistance caused by the lug nuts and bolts when the vehicle is driven.

SUMMARY OF INVENTION

This invention relates to vehicle wheels, aerodynamic covers for the vehicle wheels, and attachment systems for attaching the aerodynamic covers to the vehicle wheels.

According to one embodiment, a vehicle wheel may comprise, individually and/or in combination, one or more of the following features: a wheel disc, a wheel rim secured to the wheel disc, a wheel axis about which the vehicle wheel is configured to rotate, and a cover secured to the wheel rim. The cover extends radially inward from the wheel rim in a direction perpendicular to the wheel axis.

According to this embodiment, the vehicle wheel may further comprise a central opening of the cover. The wheel axis passes through the central opening.

According to this embodiment, the vehicle wheel may further comprise at least one vent in the cover. The at least one vent may be one of a plurality of vents. The plurality of vents is arrayed circumferentially about the cover. The at least one vent may be in an axial portion of the cover. The axial portion extends parallel to the wheel axis. The vehicle wheel may further comprise at least one tab at the at least one vent. The at least one tab extends perpendicularly from the axial portion.

According to this embodiment, the vehicle wheel may further comprise a wheel hub of the wheel disc. The cover spans between the wheel rim and the wheel hub. The vehicle wheel may further comprise a gear having first and second annular portions. The first portion has at least one lug nut opening. The at least one lug nut opening is configured to receive a lug bolt. The first portion is configured to be held compressed between the wheel disc and a lug nut on the at least one lug bolt. The cover is secured to the second portion. The cover is secured to the second portion by at least one screw.

According to this embodiment, the cover may be secured to a wheel hub of the wheel disc such that the cover contacts the wheel hub. The cover may be secured to the wheel hub by screws in keyhole slots.

According to this embodiment, the vehicle wheel may further comprise a radius portion of the wheel rim and a bead portion of the cover. The bead portion is secured in the radius portion.

According to this embodiment, the vehicle wheel may further comprise a spring ring and a compression portion of the spring ring. The spring ring compresses the cover against the wheel rim. The spring ring may be retained within a bead portion of the cover.

According to this embodiment, the vehicle wheel may further comprise an interlocking connection between the wheel rim and the cover. The interlocking connection may be screws or studs in keyhole slots.

According to this embodiment, the vehicle wheel has a greater extent in a radial direction perpendicular to the wheel axis than in an axial direction parallel to the wheel axis.

According to another embodiment, a vehicle wheel may comprise, individually and/or in combination, one or more of the following features: a wheel disc, a wheel rim secured to the wheel disc, a wheel axis about which the vehicle wheel is configured to rotate, a first cover spanning between the wheel rim and a hub portion of the wheel disc, and a second cover secured to the wheel rim. The second cover extends radially inward from the wheel rim in a direction perpendicular to the wheel axis. The first and second covers are on opposite sides of the vehicle wheel. Each of the first and second covers has a greater extent in a radial direction perpendicular to the wheel axis than in an axial direction parallel to the wheel axis.

According to this embodiment, the vehicle wheel may further comprise an axial portion of the first cover, a plurality of first vents in the axial portion, tabs at each of the first vents, a plurality of second vents in the second cover. The first and second vents are arrayed circumferentially about the wheel axis. The axial portion extends parallel to the wheel axis and the tabs extend perpendicular to the axial portion.

An advantage of an embodiment is reducing air resistance from the vehicle wheel. Other advantages of this invention will become apparent to those skilled in the art from the following detailed description of the preferred embodiments, when read in light of the accompanying drawings.

DETAILED DESCRIPTION OF THE PREFERRED EMBODIMENTS

Referring now to FIGS. 1-4, there is illustrated a vehicle wheel, indicated generally at 100, for a vehicle. The vehicle wheel 100 rotates about a wheel axis 102. The vehicle wheel 100 has a wheel disc 104 and a wheel rim 106. The wheel rim 106 is secured to the wheel disc 104. The general structure of the wheel disc 104 and the wheel rim 106 are known in the prior art. The wheel rim 106 extends axially in a direction parallel to the wheel axis 102. As non-limiting examples, the vehicle wheel 100 may be fabricated from steel or aluminum material. As non-limiting examples, the vehicle wheel 100 may be for a passenger vehicle, a light truck, or a commercial highway vehicle.

Figure 1:
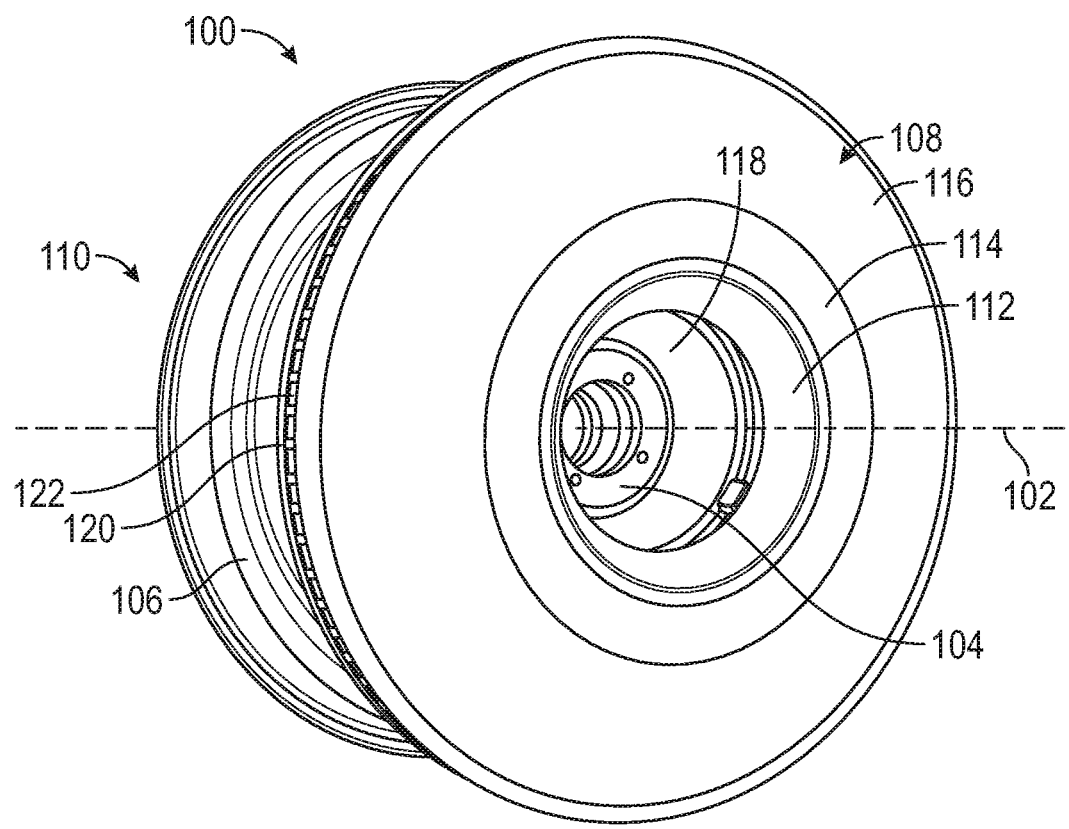
FIG. 1 is a first perspective view of a vehicle wheel in accordance with a first embodiment of the present invention.
Figure 2:
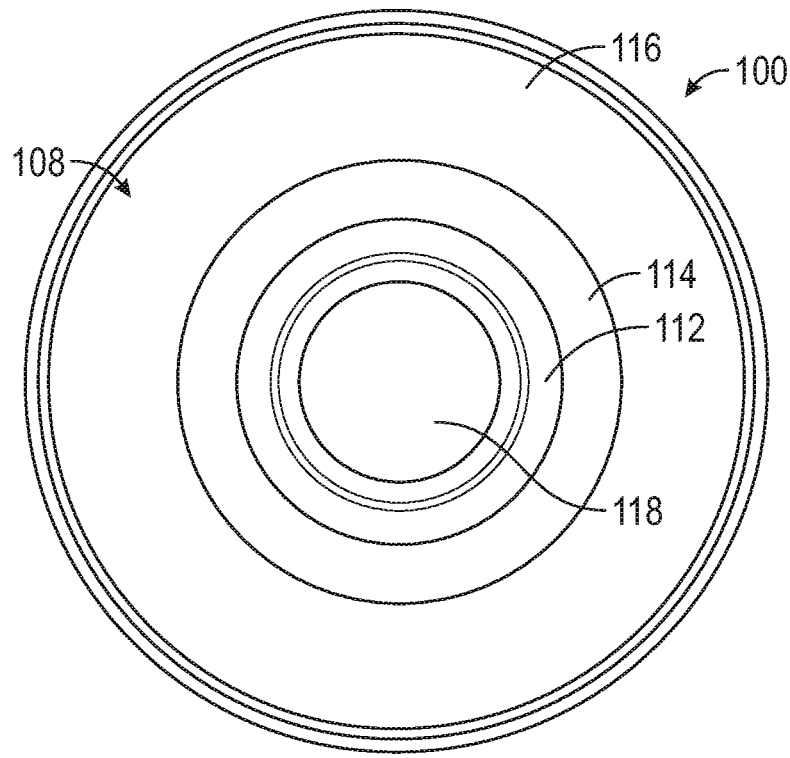
FIG. 2 is an elevation view of the vehicle wheel of FIG. 1.
Figure 3:
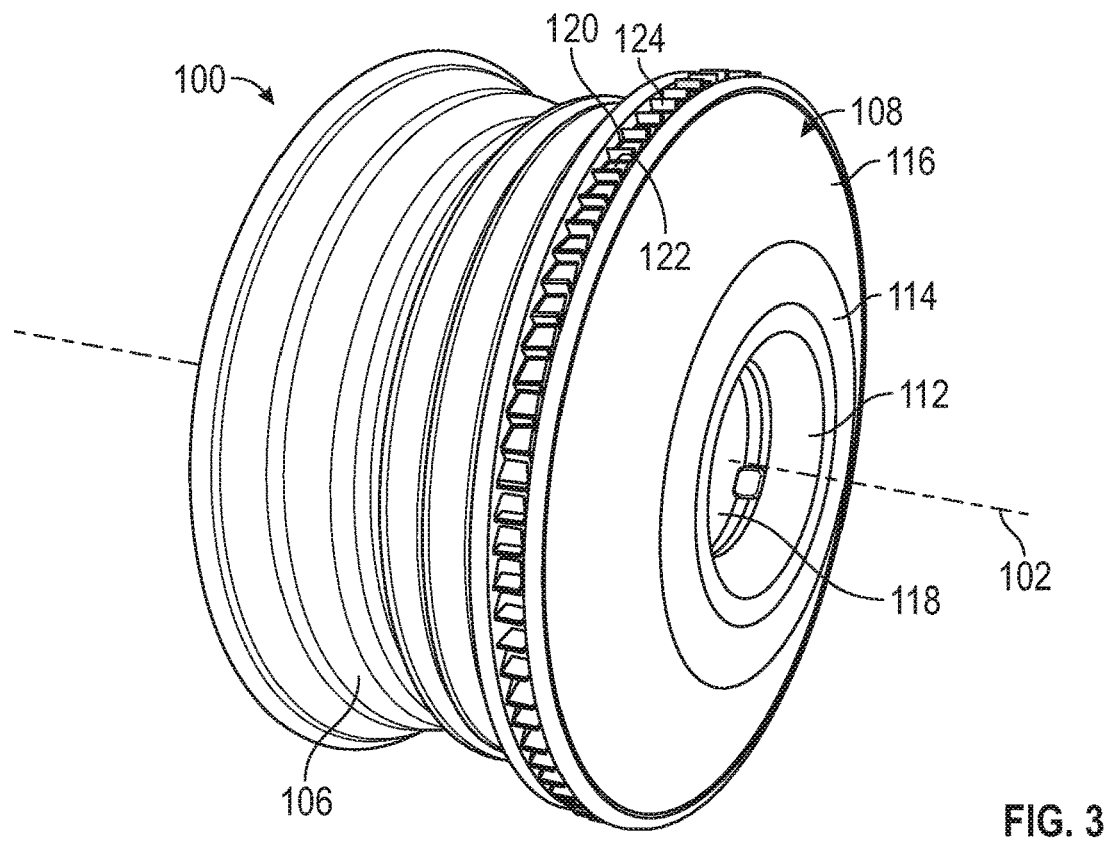
FIG. 3 is a second perspective view of the vehicle wheel of FIG. 1.
Figure 4:
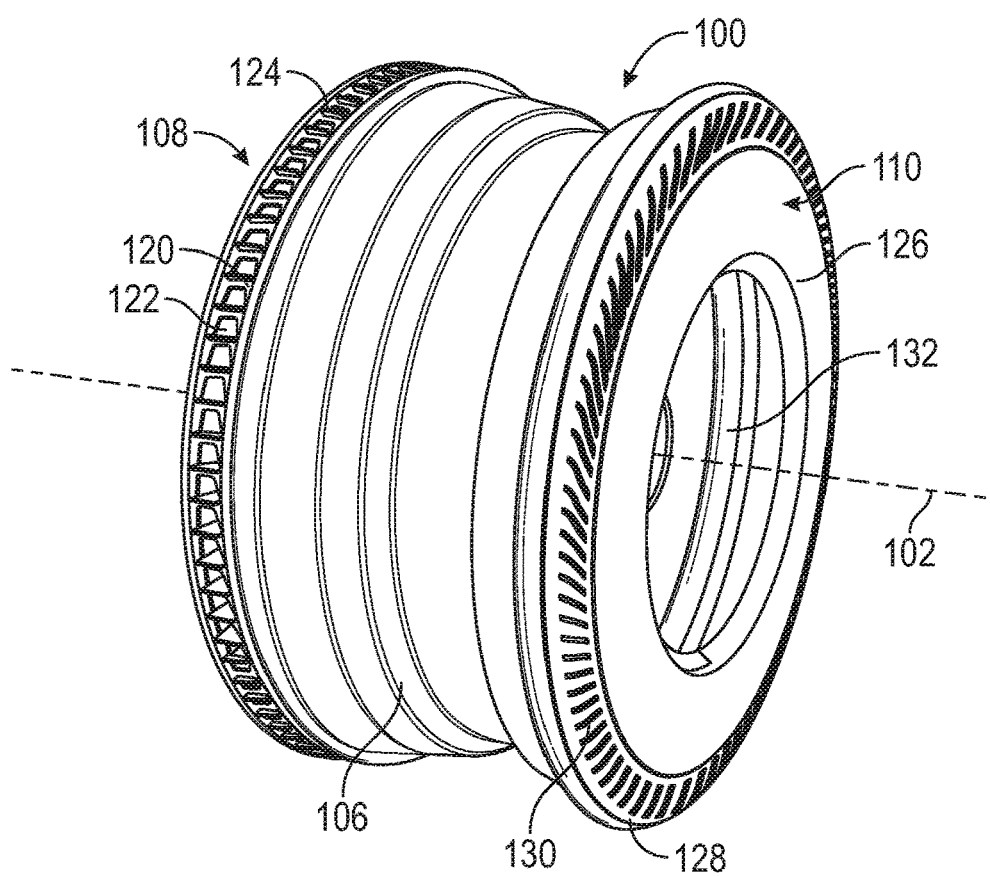
FIG. 4 is a third perspective view of the vehicle wheel of FIG. 1.

The vehicle wheel 100 further has a first aerodynamic cover, indicated generally at 108 and shown in FIGS. 1-3, and a second aerodynamic cover, indicated generally at 110 and shown in FIG. 4. Preferably, and as illustrated, the first and second covers 108 and 110, respectively, are separate components or elements that are attached or otherwise installed on a complete vehicle wheel such as the vehicle wheel 100. The first and second covers 108 and 110, respectively, are transverse to, and centered on, the wheel axis 102. Indeed, the first and second covers 108 and 110, respectively, are generally in planes that intersect the wheel axis 102. As shown in the drawings, the first and second covers 108 and 110, respectively, extend radially inward from the wheel rim 106 towards the wheel axis 102 in a direction perpendicular to the wheel axis 102.

Preferably, the first and second covers 108 and 110, respectively, are fabricated from a plastic material. Alternatively, the first and/or second cover 108 and/or 110, respectively, may be fabricated from other than a plastic material. As a non-limiting example, the first and/or second cover 108 and/or 110, respectively, may be fabricated from a metallic material such as aluminum.

As illustrated, the first cover 108 is installed on an intended outboard side of the vehicle wheel 100 and the second cover 110 is installed on an intended inboard side of the vehicle wheel 100. As such, the first and second covers 108 and 110, respectively, are on opposite sides of the vehicle wheel 100. Alternatively, the first and second covers 108 and 110, respectively, may be installed on the vehicle wheel 100 other than as illustrated. As a non-limiting example, the first cover 108 may be installed on the inboard side of the vehicle wheel 100 and/or the second cover 110 may be installed on the outboard side of the vehicle wheel 100.

As shown in FIGS. 1-3, the first cover 108 extends radially between the wheel axis 102 and the wheel rim 106. As illustrated, the first cover 108 has first, second, and third adjoining, annular portions 112, 114, and 116, respectively. Alternatively, the first cover 108 may have more or fewer annular portions than the first, second, and third annular portions 112, 114, and 116, respectively. The first and third annular portions 112 and 116, respectively, are generally transverse to the wheel axis 102 and the second annular portion 114 is generally perpendicular to the wheel axis 102. The third annular portion 116 defines an opening 118 in the first cover 108. The opening 118 is preferably a central opening centered on the wheel axis 102. The first, second, and third annular portions 112, 114, and 116, respectively, will be discussed further.

Between the third annular portion 116 and the wheel rim 106 is an axial portion 120. As illustrated, the axial portion 120 extends substantially parallel to the wheel axis 102. Alternatively, the axial portion 120 may extend other than substantially parallel to the wheel axis 102. Defined within the axial portion 120 are vents 122 arrayed circumferentially about the first cover 108. The vents 122 extend substantially parallel to the wheel axis 102. As illustrated, the vents 122 are trapezoidal in shape. Alternatively, the vents 122 may be other than trapezoidal in shape. As non-limiting examples, the vents 122 may be circular, triangular, or otherwise shaped. As illustrated, each of the vents 122 has a corresponding, planar tab or flap 124 extending in a radial direction from the wheel axis 102. The tabs 124 are perpendicular to the axial portion 120 at each of the corresponding vents 122. The tabs 124 break radial turbulence and improve air movement through the vents 122. Alternatively, the tabs 124 may be omitted for one or more, or all, of the vents 122. Alternatively, the tabs 124 may extend in a direction other than as illustrated. As non-limiting examples, the tabs 124 may extend at acute or obtuse angles to the axial portion 120 or the tabs 124 may be curved or otherwise non-planar.

As illustrated, the tabs 124 extend both radially outward and inward from the axial portion 120. Alternatively, the tabs 124 may extend only outward or inward from the axial portion 120. Alternatively, some of the tabs 124 may extend outward from the axial portion 120 while others of the tabs 124 extend inward from the axial portion 120. Alternatively, different groupings of the tabs 124 may extend only outward, only inward, and/or both outward and inward from the axial portion 120.

As shown in FIG. 4, the second cover 110 has first and second annular portions 126 and 128, respectively. Alternatively, the second cover 110 may have more or fewer annular portions than the first and second annular portions 126 and 128, respectively. The first and second annular portions 126 and 128, respectively, are generally perpendicular or otherwise transverse to the wheel axis 102. Within the second annular portion 128 are vents 130 circumferentially arrayed about the second cover 110. As illustrated, the vents 130 are arranged extending substantially transverse to the wheel axis 102 and not extending radially from the wheel axis 102. As a non-limiting example, the vents 130 may have a spiral arrangement about the wheel axis 102. As illustrated, the vents 130 have generally parallel opposite sides and pass through the second annular portion 128 at an angle to a surface of the second annular portion 128. Alternatively, the vents 130 may be other than as illustrated. The first annular portion 126 defines an opening 132 in the second cover 110. Preferably, the opening 132 is a central opening centered about the wheel axis 102.

Figure 5:
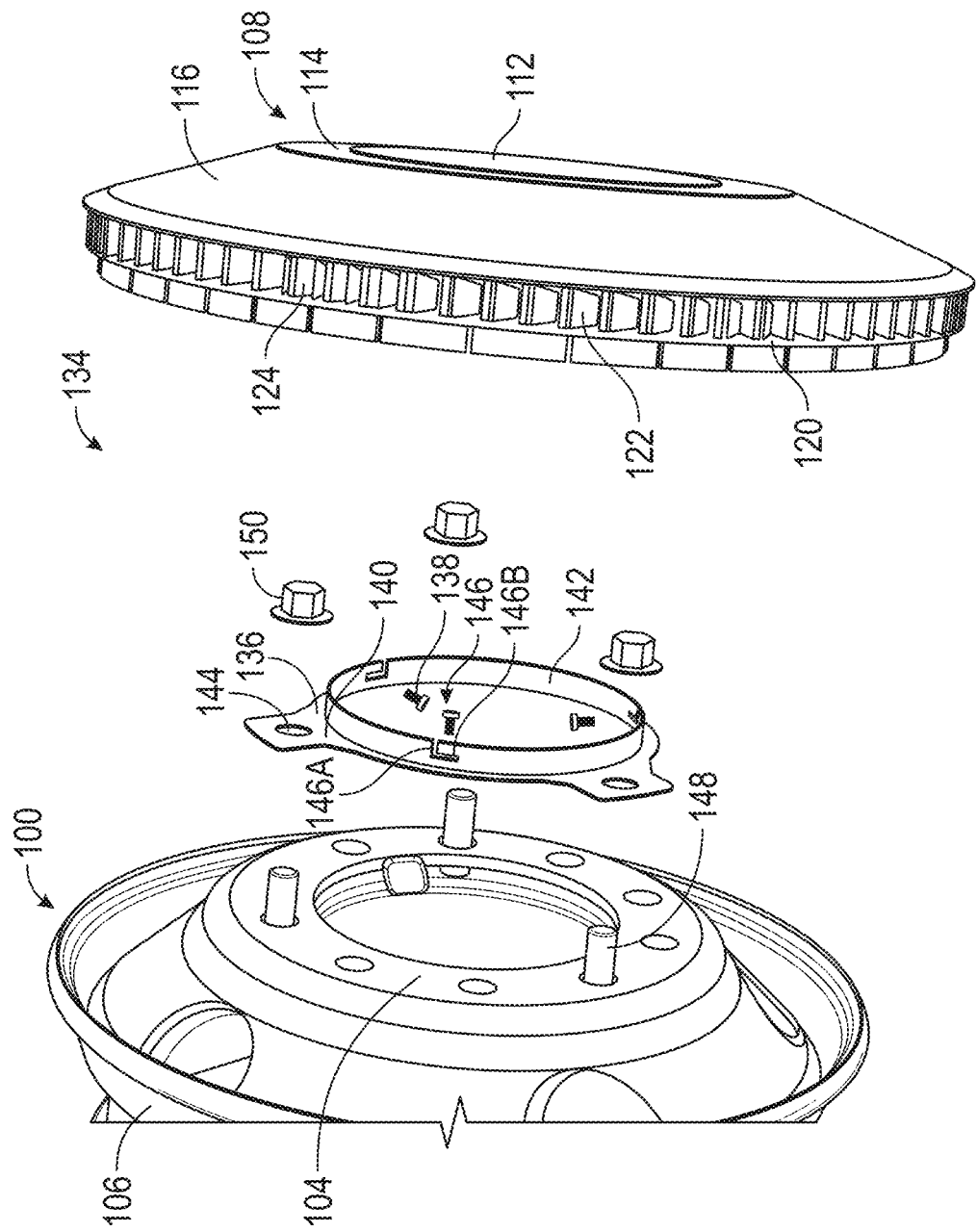
FIG. 5 is a first partial exploded perspective view of a first cover and a first attachment system of the vehicle wheel of FIG. 1.

Referring now to FIG. 5, there is illustrated a first attachment system, indicated generally at 134, for installing or otherwise securing the first cover 108 on the vehicle wheel 100. The first attachment system 134 is preferably usable to install the first cover 108 on prior art vehicle wheels without modification to the prior art vehicle wheels. The first attachment system 134 includes an annular gear or ring 136 and screws 138, both of which will be discussed in detail with reference to FIGS. 6-7A. The gear 136 is preferably fabricated from a metallic material such as steel or aluminum. Alternatively, the gear 136 may be fabricated from a plastic material. The gear 136 has perpendicular first and second portions 140 and 142, respectively. The first portion 140 has openings 144 for lug bolts and the second portion 142 has slots, indicated generally at 146, for the screws 138. As illustrated, the lug bolt openings 144 are circular and the screw slots 146 have L-shapes. Alternatively, the lug bolt openings 144 and/or the screw slots 146 may have shapes other than as illustrated. Also shown in FIG. 5 are lug bolts 148 and lug nuts 150 for the vehicle wheel 100.

Figure 6:
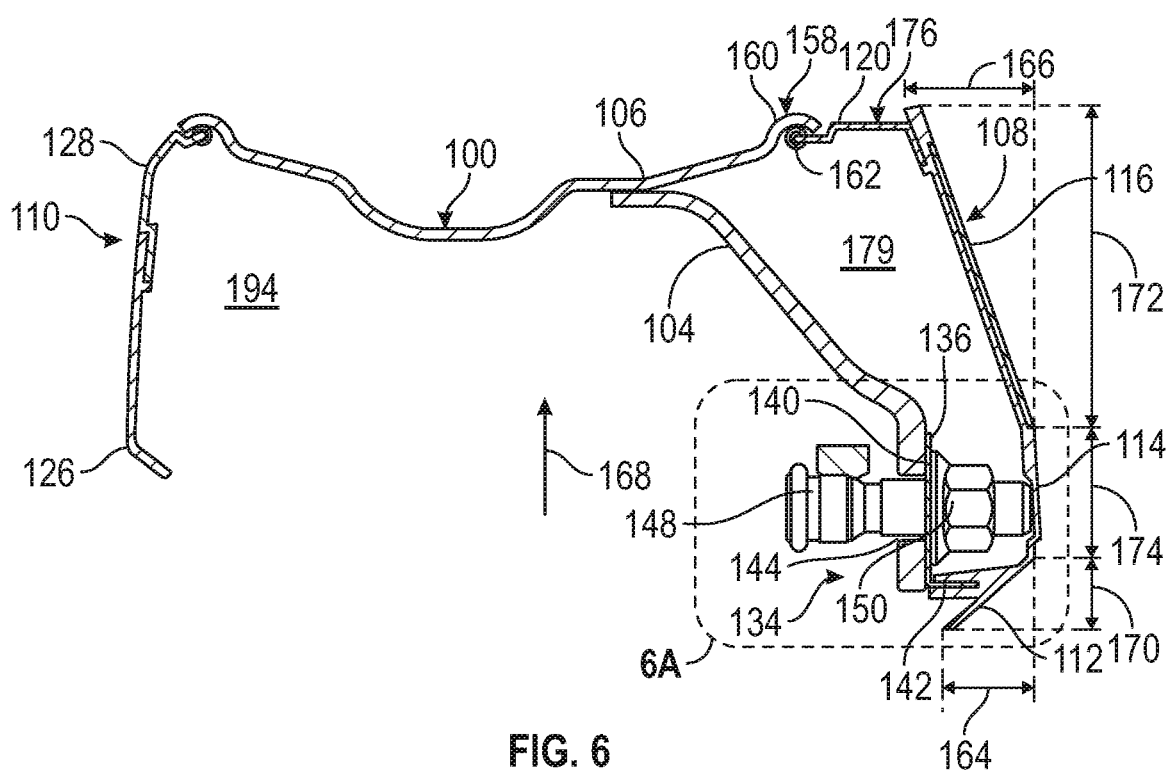
FIG. 6 is a first section view through the vehicle wheel of FIG. 1 and showing the first cover and the first attachment system.
Figure 6A:
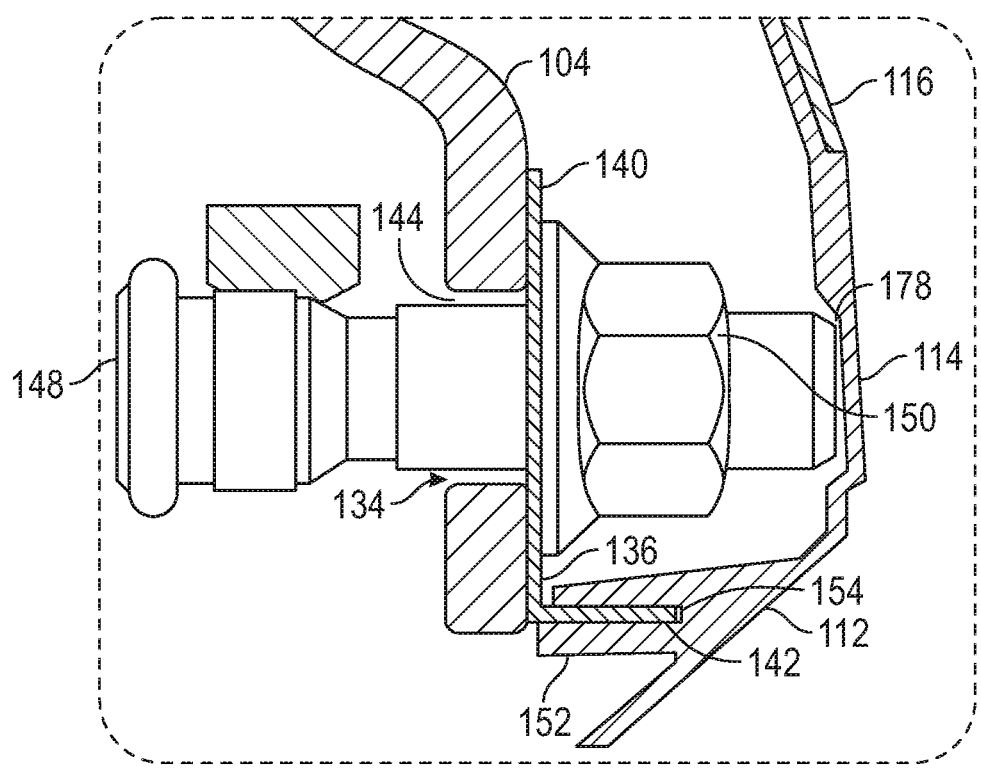
FIG. 6A is an enlarged portion of FIG. 6.

Referring now to FIGS. 6 and 6A, the gear 136 is shown installed on the wheel disc 104. The lug bolts 148 are secured in a known manner to the vehicle having the vehicle wheel 100. The lug bolts 148 pass through the lug bolt openings 144 in the first portion 140. The first portion 140 is held on the lug bolts 148 by the lug nuts 150—i.e., the first portion 140 is held compressed between the wheel disc 104 and the lug nuts 150. Preferably, the lug bolt openings 144 are sized to fit the lug bolts 148 without the gear 136 rotating or otherwise moving on the wheel disc 104 when installed on the wheel disc 104.

Figure 7:
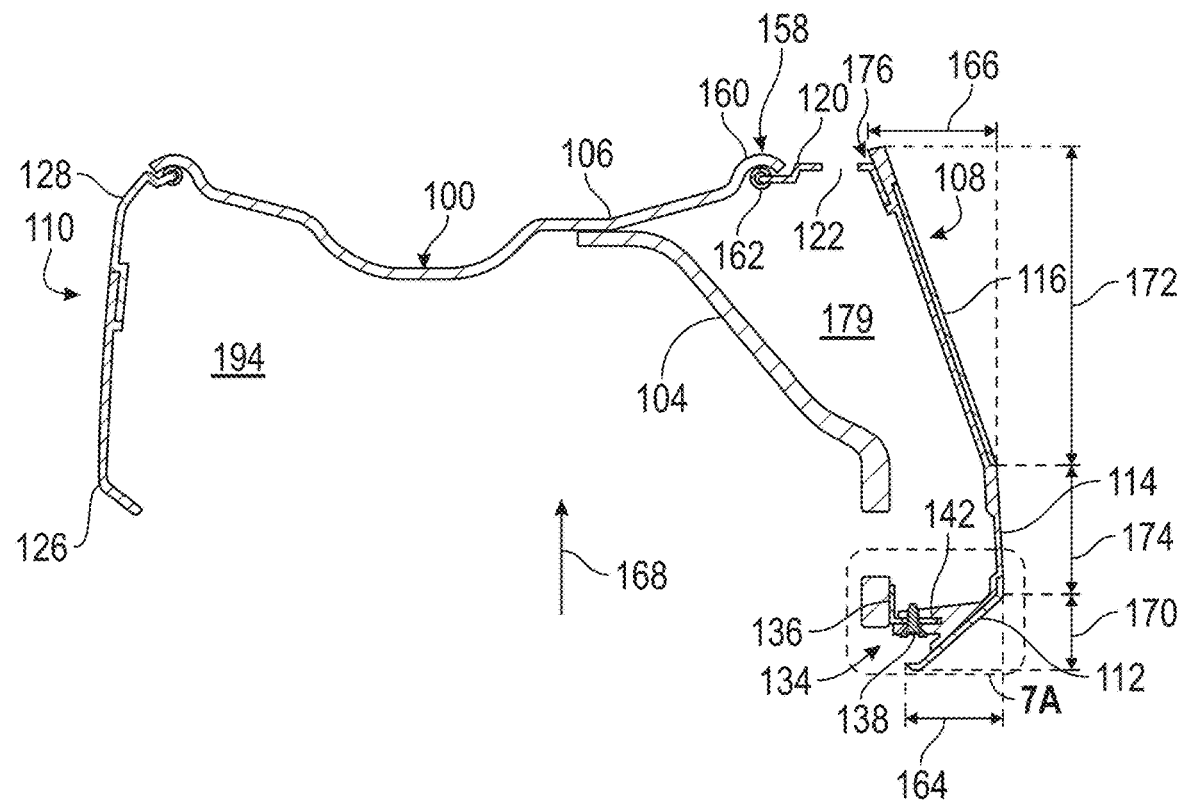
FIG. 7 is a second section view through the vehicle wheel of FIG. 2 and showing the first cover and the first attachment system.
Figure 7A:
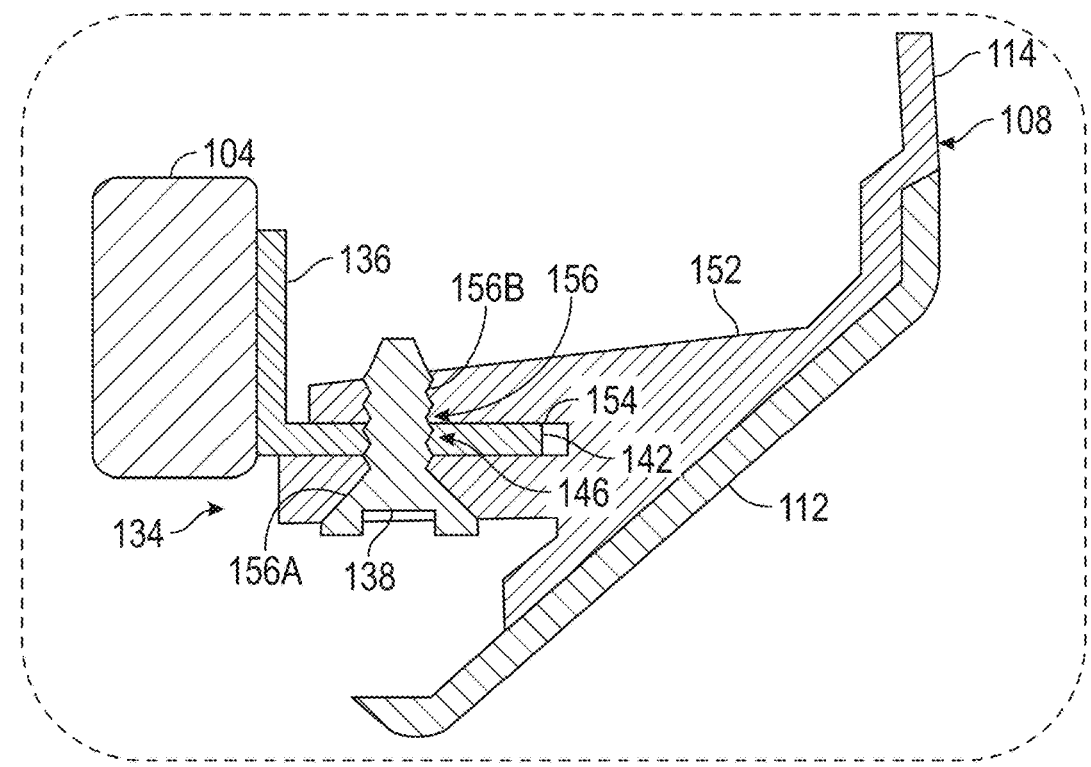
FIG. 7A is an enlarged view of portion of the vehicle wheel shown in FIG. 7.

Referring now to FIGS. 7 and 7A, the first cover 108 is shown installed on the gear 136. The first cover 108 has a support portion 152 extending axially from the first annular portion 112 towards the wheel disc 104. Within the support portion 152 are an annular groove 154 and radially extending screw holes, indicated generally at 156. The screw holes 156 are interrupted by the groove 154 and, as a result, have first and second portions 156A and 156B, respectively, on opposite sides of the groove 154. The screws 138 pass through the screw slots 146 and between the first and second portions 156A and 156B, respectively, of the screw holes 156. As a result, the second portion 142 of the gear 136 is retained in the groove 154 and the first cover 108 is installed on the vehicle wheel 100.

Preferably, the screws 138 are first installed in the screw holes 156 such that the screws 138 span between the first and second portions 156A and 156B, respectively. Next, the gear second portion 142 is inserted in the groove 154 such that the screws 138 enter a first axial portion 146A of the screw slots 146. Lastly, the first cover 108 is rotated about the wheel axis 102 such that the screws 138 move from the first axial portions 146A to second circumferential portions 146B of the screw slots 146. The first cover 108 is then installed on the vehicle wheel 100. The screws 138 may be further tightened once in the second circumferential portions 146B.

FIGS. 6 and 7 also show an outer connection, indicated generally at 158, between the first cover 108 and the wheel rim 106. The outer connection 158 is part of the first attachment system 134. Alternatively, the outer connection 158 may be omitted. The wheel rim 106 has an inner lip portion 160 and the first cover 108 has a bead portion 162. As illustrated, the first cover 108 generally extends radially inward from the inner lip portion 160 and towards the wheel axis 102. More specifically, the first cover 108 extends radially inward towards the wheel axis 102 from the axial portion 120. Alternatively, the second cover 110 may extend other than as illustrated. The second cover 110 has a greater extent in a radial direction perpendicular to the wheel axis 102 than in an axial direction parallel to the wheel axis 102.

As a non-limiting example, when the first cover 108 is installed on the vehicle wheel 100, the bead portion 162 is displaced radially inward towards the wheel axis 102. While displaced radially inward, the bead portion 162 is placed into the inner lip portion 160. When released, the bead portion 162 displaces radially outward from the wheel axis 102 and into the inner lip portion 160—i.e., the bead portion 162 "clips" under the inner lip portion 160.

Referring again to FIGS. 6 and 7, the geometric relationships between the first, second, and third annular portions 112, 114, and 116, respectively, of the first cover 108 are also shown. Parallel to the wheel axis 102, the first annular portion 112 has a first axial dimension 164 that is less than a second axial dimension 166 of the third annular portion 116. In a radial direction 168 that is perpendicular to the wheel axis 102, the first annular portion 112 has a first radial dimension 170 that is less than a second radial dimension 172 of the third annular portion 116. The second annular portion 114 has a third radial dimension 174 in the radial direction 168 that has a value between the first and second radial dimensions 170 and 172, respectively. A sum of the first, second, and third radial dimensions 170, 174, and 172, respectively, is greater than the first or second axial dimensions 164 and 166, respectively. As a result, the first cover 108 has a greater extent in a radial direction perpendicular to the wheel axis 102 than in an axial direction parallel to the wheel axis 102.

As shown in FIGS. 6 and 7, the first and third annular portions 112 and 116 are at intersecting angles relative to each other—i.e., if the first and third annular portions 112 and 116 projected further, they would intersect. The third annular portion 116 extends radially outward beyond the axial portion 120 such that an "overhang" or other protrusion, indicated generally at 176 is defined. Alternatively, the geometric relationships between the first, second, and third annular portions 112, 114, and 116, respectively, of the first cover 108 may be other than as shown in FIGS. 6 and 7. Preferably, the first cover 108 extends radially inward from the wheel rim 106 in a direction perpendicular to the wheel axis 102.

As shown in FIG. 6, the first cover 108 has a "tented" shape to clear or otherwise accommodate the lug bolts 148. As the lug bolts 148 are shortened in a direction parallel to the wheel axis 102 to extend less far from the wheel disc 104 towards the first cover 108, the first cover 108 may be "flattened" from the tent shape illustrated by reducing the first and second axial dimensions 164 and 166, respectively. A recess 178 is defined in an underside of the second annular portion. The recess 178 accommodates the lug bolts 148 (best shown in FIG. 6A). Preferably, the recess 178 is annularly shaped. Alternatively, the recess 178 may be provided only at each of the lug bolts 148. Alternatively, the recess 178 may be omitted.

As illustrated in FIGS. 6 and 7, the first, second, and third annular portions 112, 114, and 116, respectively, have planar sections. Alternatively, one or more of the first, second, and/or third annular portions 112, 114, and/or 116 may have curved or otherwise non-planar sections.

As a non-limiting example, the first cover 108 may be fabricated monolithically from plastic material. Alternatively, one or more of the first annular portion 112, second annular portion 114, third annular portion 116, and/or the axial portion 120 may be separately fabricated and then assembled or otherwise combined with the remaining portions. When one or more of the first annular portion 112, second annular portion 114, third annular portion 116, and/or the axial portion 120 are separately fabricated, one or more of the first annular portion 112, second annular portion 114, third annular portion 116, and/or the axial portion 120 may be fabricated from different materials than each other.

FIGS. 6 and 7 show a first cavity or hollow space 179 defined between the vehicle rim 106 and the wheel disc 104 on the intended outboard side of the vehicle wheel 100. A portion of the lug bolts 148 as well as the lug nuts 150 are in the first cavity space 179. The first cover 108 extends radially inward from the vehicle rim 106 and towards the wheel axis 102 to cover the first cavity space 179. As illustrated, the first cover 108 fully spans or otherwise covers the first cavity space 179 (the opening 118 is not part of the first cavity space 179). Alternatively, the first cover 108 may partially cover the first cavity space 179. Furthermore, the first cavity space 179 may be defined other than as illustrated.

Figure 8:
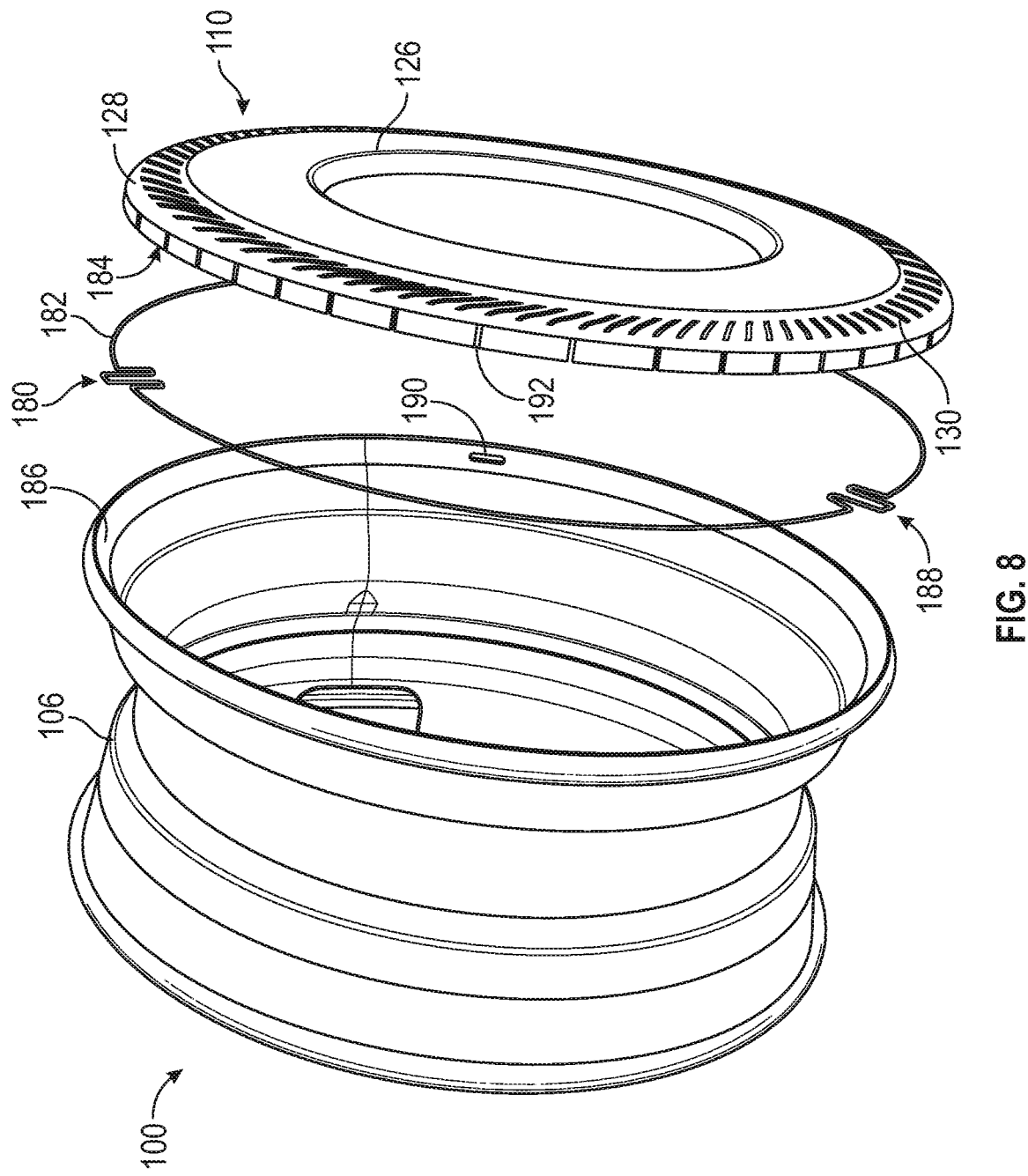
FIG. 8 is a second exploded perspective view of a second cover and a second attachment system of the vehicle wheel of FIG. 1.
Figure 9:
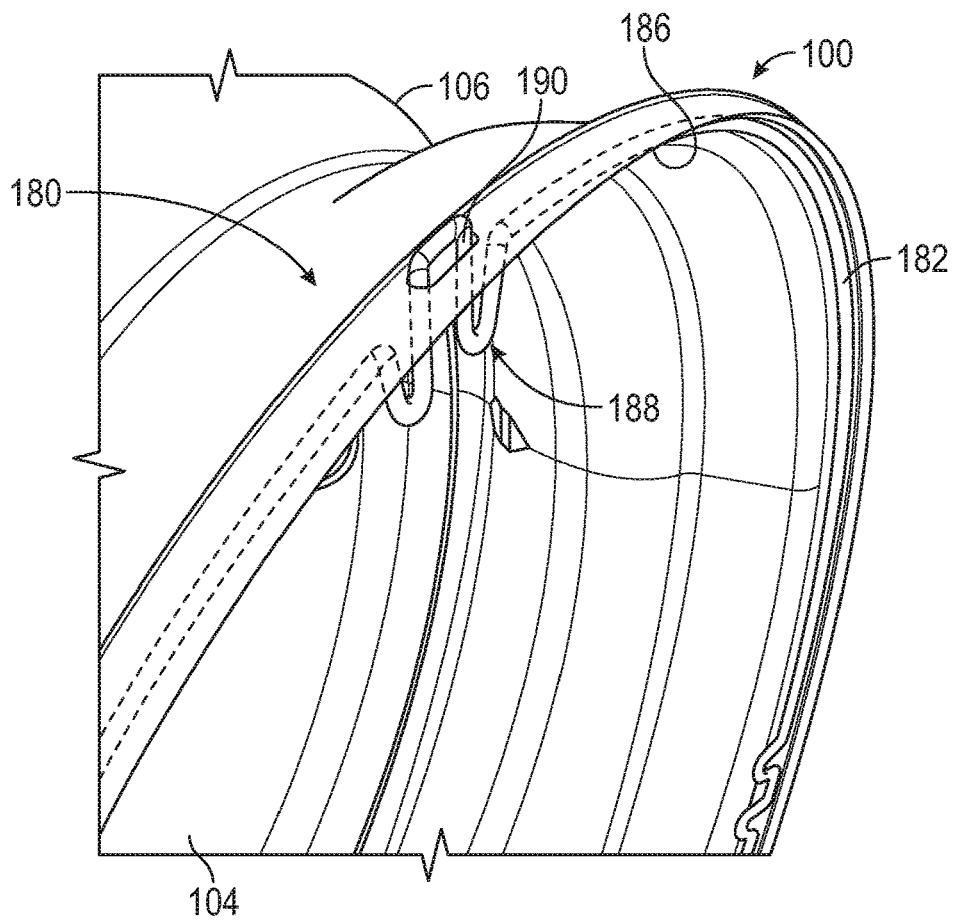
FIG. 9 is a first partial perspective view of the vehicle wheel of FIG. 1 and the second attachment system.
Figure 10:
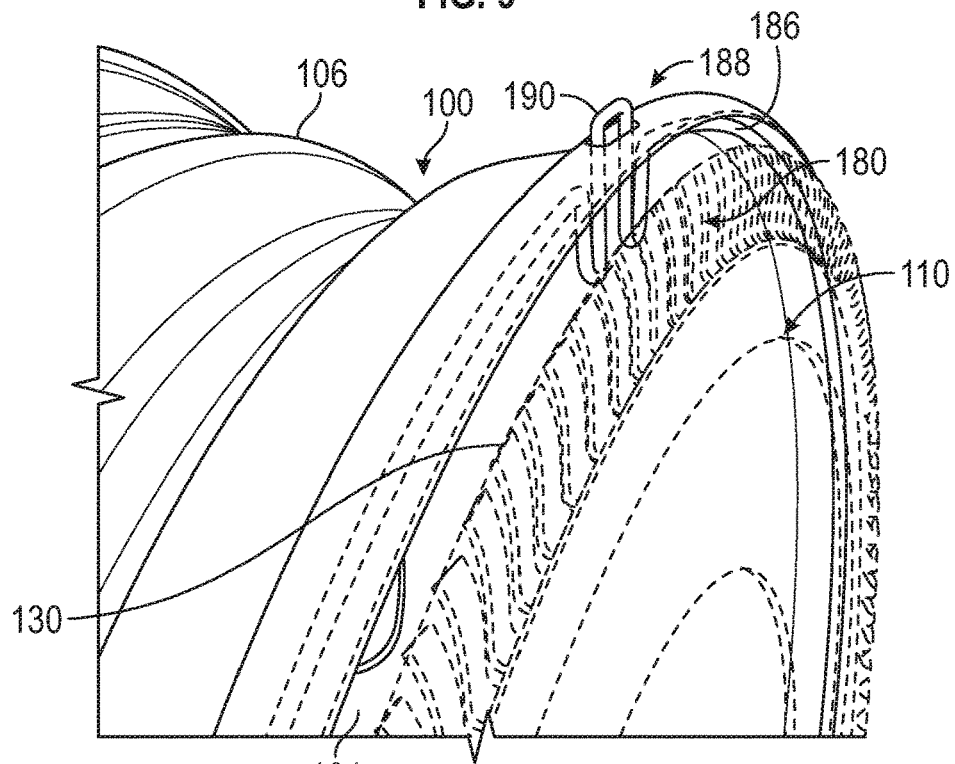
FIG. 10 is a second partial perspective view of the vehicle wheel of FIG. 1 and the second cover and the second attachment system.
Figure 11:
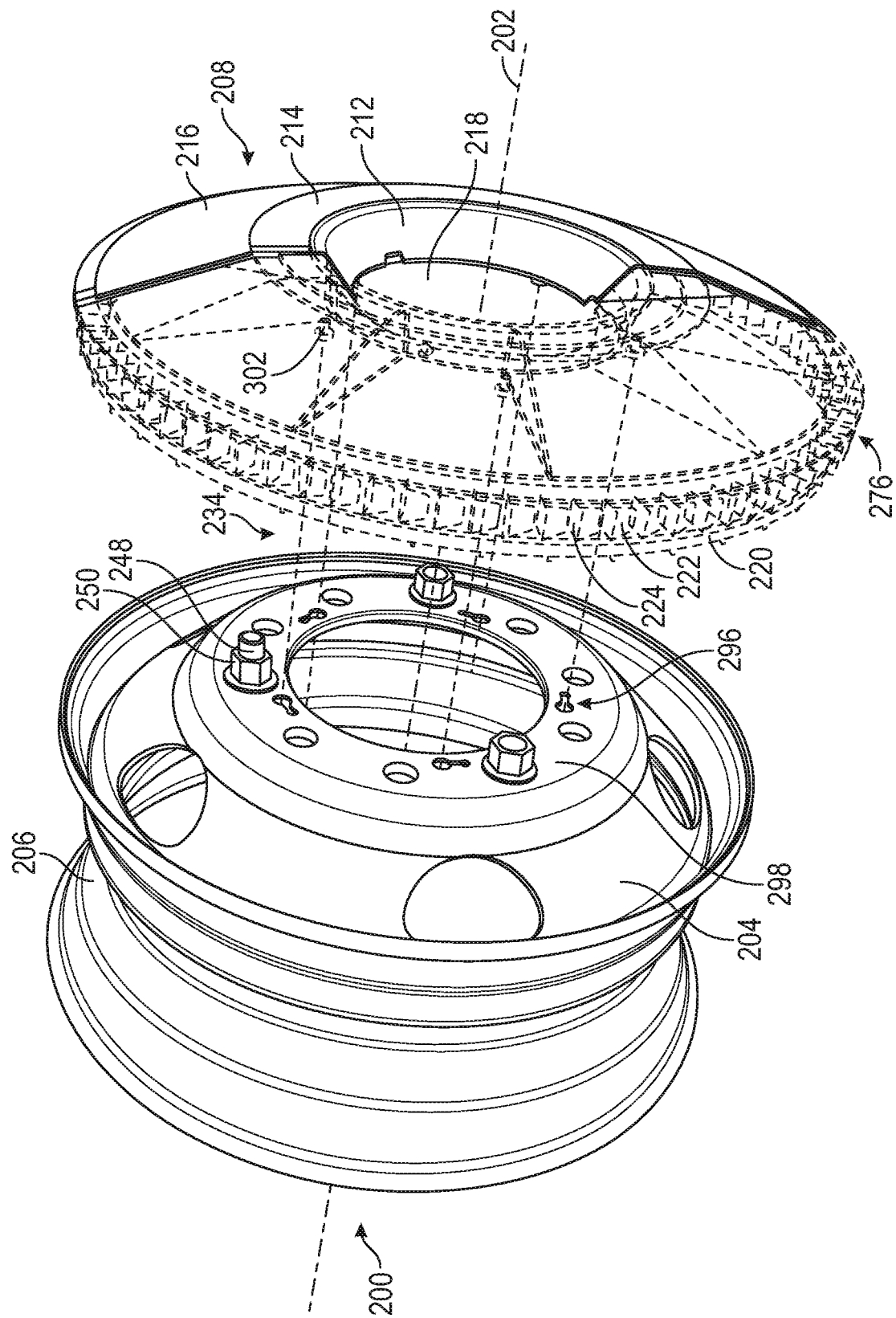
FIG. 11 is a partial exploded perspective view of a vehicle wheel in accordance with a second embodiment of the present invention.
Figure 12:
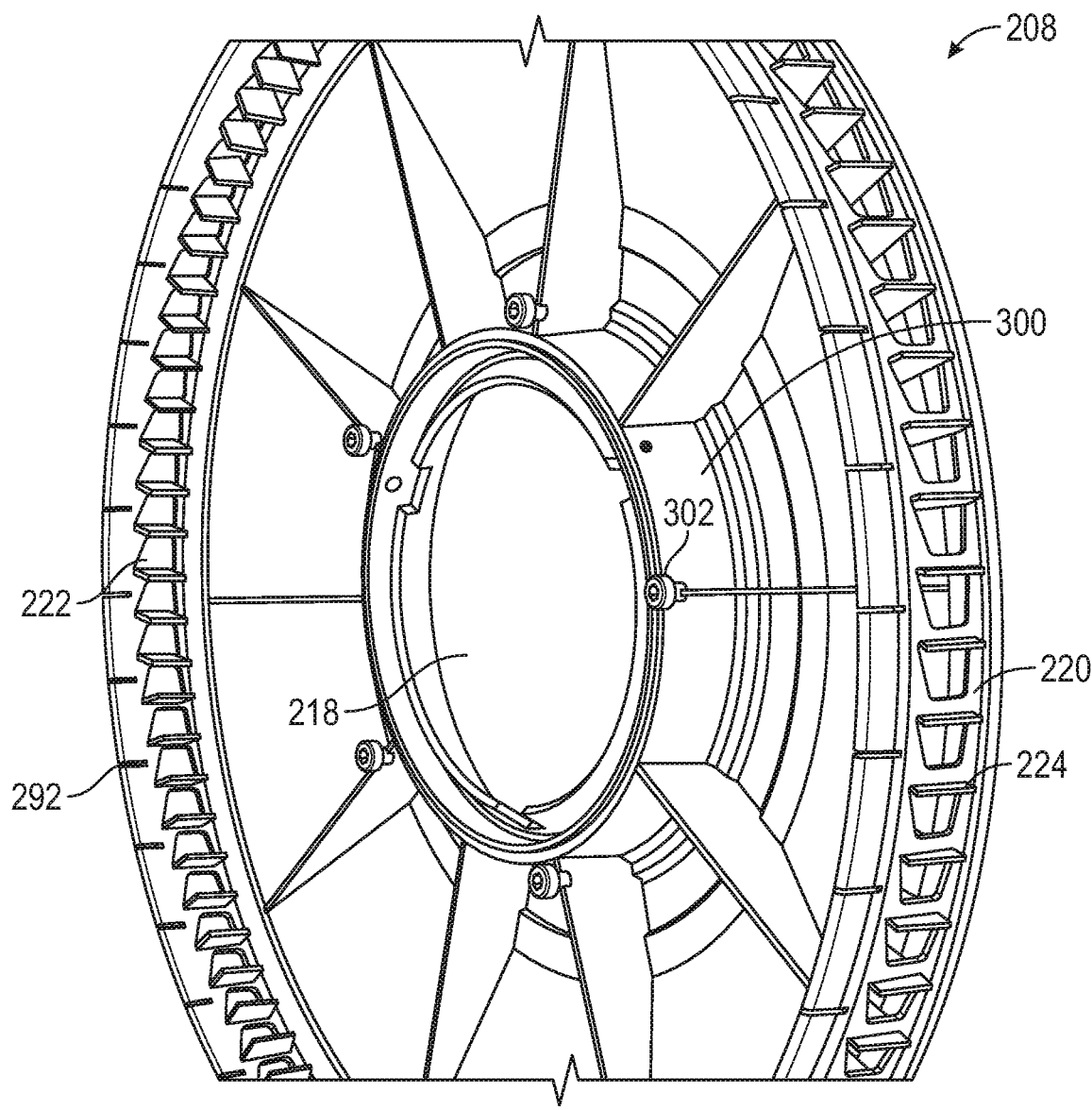
FIG. 12 is a partial perspective view of a cover and an attachment system of the vehicle wheel of FIG. 11.

Referring now to FIGS. 8-10, there is illustrated a second attachment system, indicated generally at 180, for installing or otherwise securing the second cover 110 on the vehicle wheel 100. Preferably, the second cover 110 extends radially inward from the wheel rim 106 in a direction perpendicular to the wheel axis 102

A spring ring 182 compresses an annular flange portion 184 of the second cover 110 against an annular inner lip portion 186 of the wheel rim 106. As non-limiting examples, the spring ring 182 may be fabricated from metallic or plastic material. As illustrated, the second cover 110 extends radially inward from the inner lip portion 186 and towards the wheel axis 102. Alternatively, the second cover 110 may extend other than as illustrated.

The spring ring 182 has compression portions, indicated generally at 188. As illustrated, the compression portions 188 have a W-shape. The wheel rim 106 has through slots or other penetrations 190 that correspond to the compression portion 188 of the spring ring 182. Furthermore, the second cover 110 has gaps 192 in the flange portion 184. The gaps 192 allow deformation or other movement of the second cover 110 during installation of the second cover 110 on the vehicle wheel 100 and when the vehicle having the vehicle wheel 100 is driven. During installation of the second cover 110 on the vehicle wheel 100, the flange portion 184 between two of the flange gaps 192 may be displaced to allow the compression portions 188 to enter the through slots 190. Alternatively, through openings for the compression portions 188 may be provided in the second cover 110.

When the second cover 110 is installed on the vehicle wheel 100, the spring ring 182 compresses the flange portion 184 of the second cover 110 against the inner lip portion 186 of the wheel rim 106. This may be accomplished by the spring ring 182, in an uncompressed state, having a greater diameter than the wheel rim 106. During installation of the second cover 110 on the vehicle wheel 100, one or more of the compression portions 188 are compressed and the spring ring 182 is placed inside the flange portion 184. The second cover 110 is then positioned inside the wheel rim 106 such that each of the compression portions 188 radially aligns with one of the through slots 190. The compression portions 188 are inserted into the through slots 190 (as shown in FIGS. 9 and 10) and the compressed compression portions 188 are released. The spring ring 182 then exerts a radially outward force that compresses the flange portion 184 against the inner lip portion 186 to secure the second cover 110 on the vehicle wheel 100.

FIGS. 6 and 7 show a second cavity or hollow space 194 defined inside the vehicle rim 106 on the intended inboard side of the vehicle wheel 100. The second cover 110 extends radially inward from the vehicle rim 106 and towards the wheel axis 102 to cover the second cavity space 194. As illustrated, the second cover 110 partially covers the second cavity space 194. Alternatively, the second cover 110 may fully cover the second cavity space 194. Furthermore, the second cavity space 194 may be defined other than as illustrated.

Referring now to FIGS. 11-14A, there is illustrated a vehicle wheel, indicated generally at 200, in accordance with a second embodiment of the present invention. The vehicle wheel 200 is a variation of the vehicle wheel 100. As such, like reference numerals, increased by 100, designate corresponding parts in the drawings and detailed description thereof will be omitted.

The vehicle wheel 200 has a first attachment system, indicated generally at 234, in the form of an interlocking connection between the wheel 200 and the first cover 208. A wheel disc 204 of the vehicle wheel 200 has slots, indicated generally at 296. As illustrated, the slots 296 are keyhole slots. Alternatively, the slots 296 may be other than keyhole slots. The keyhole slots 296 are in an annular hub or wheel mounting portion 298 of the wheel disc 204. A first cover 208 has a flange portion 300 extending parallel to a wheel axis 202 from a second annular portion 214. Screws 302 are partially screwed into the flange portion 300 such that heads of the screws 302 are not flush with, or otherwise spaced apart from, the flange portion 300. The screws 302 are then inserted into the keyhole slots 296 such that the first cover 208 is retained on the vehicle wheel 200. Alternatively, the screws 302 may be studs formed with, or inserted into, the flange portion 300.

Figure 13:
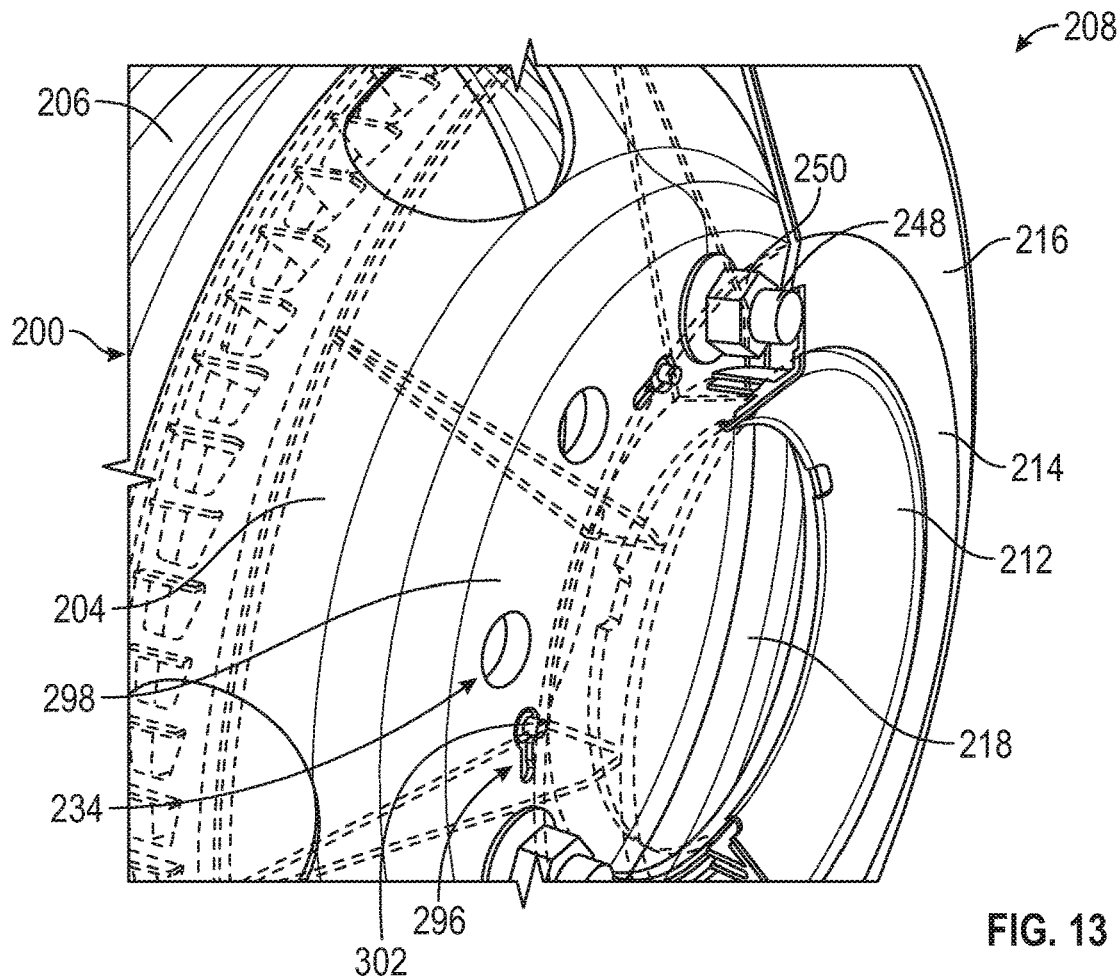
FIG. 13 is a partial perspective view of the vehicle wheel of FIG. 12 in a first assembly state.
Figure 13A:
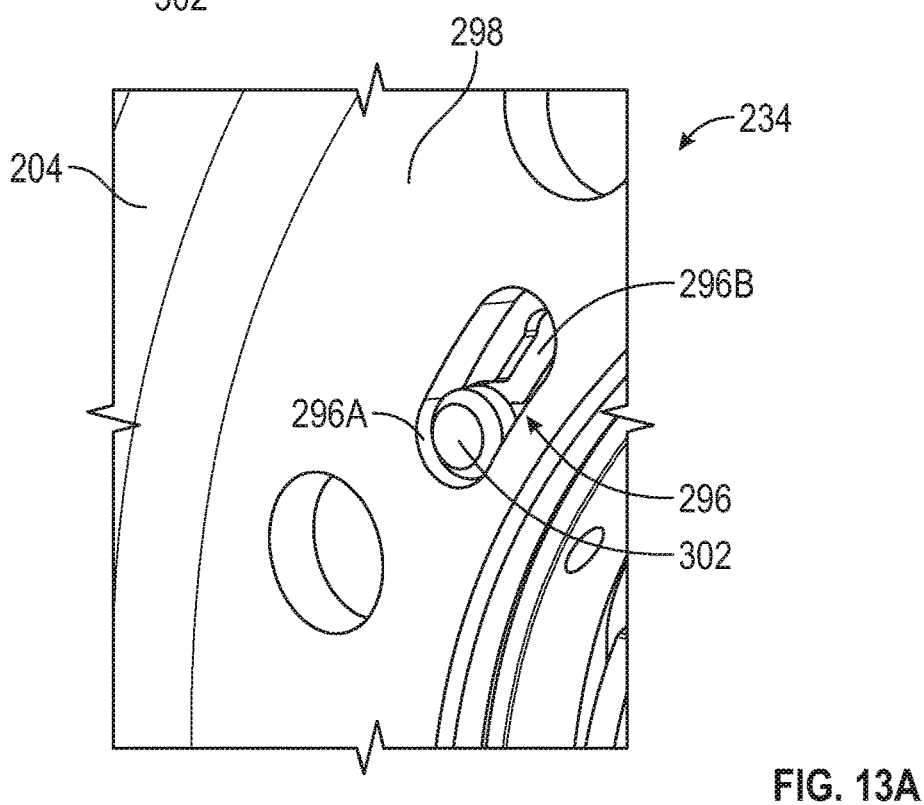
FIG. 13A is a detail perspective view of the vehicle wheel of FIG. 13.
Figure 14:
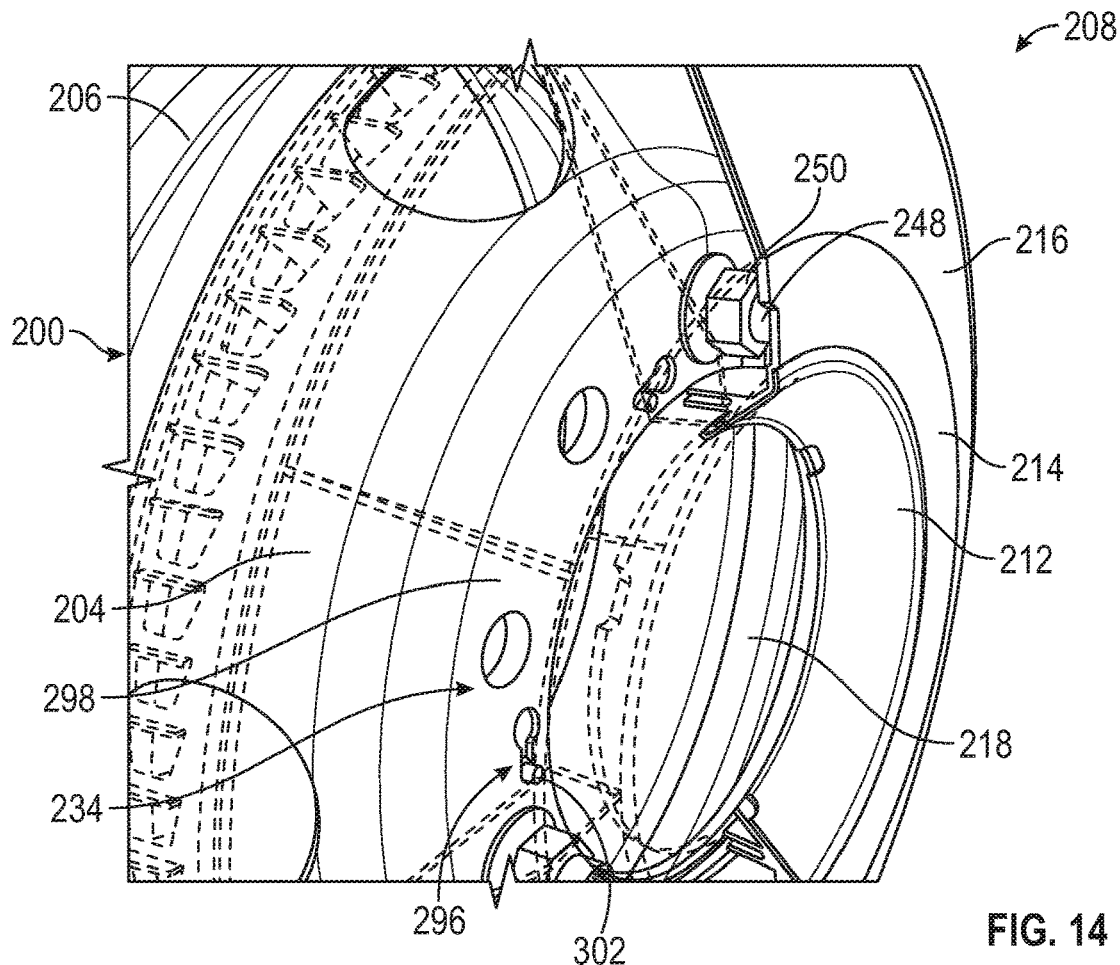
FIG. 14 is a partial perspective view of the vehicle wheel of FIG. 12 in a second assembly state.
Figure 14A:
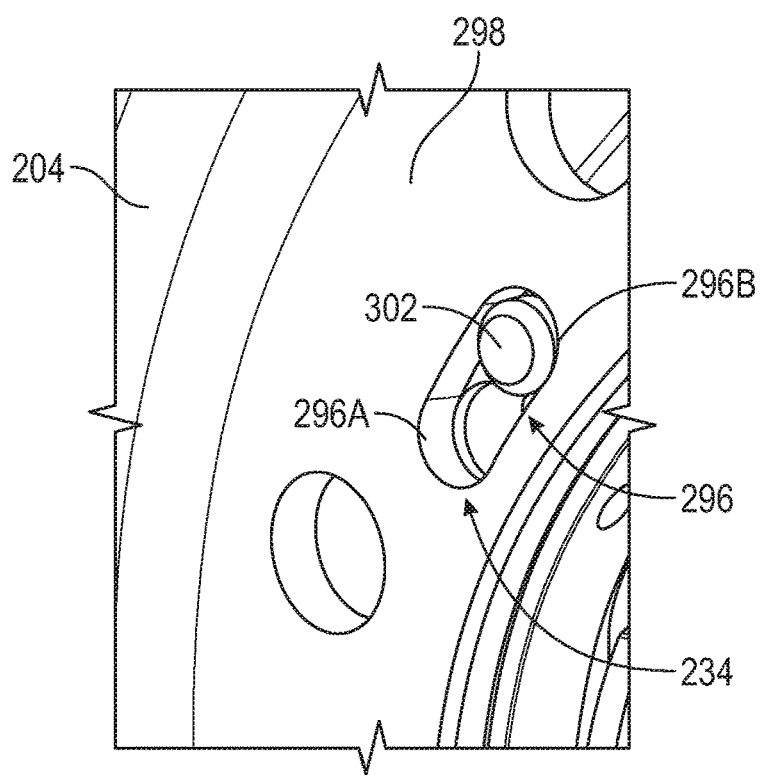
FIG. 14A is a detail perspective view of the vehicle wheel of FIG. 14.

As a non-limiting example, the first cover 208 may be installed on the vehicle wheel 200 as follows. First, the screws 302 are initially screwed or otherwise partially inserted into the flange portion 300. Next, the first cover 208 is positioned on the vehicle wheel 200 such that the screws 302 enter first, wide portions 296A of the keyhole slots 296. The first cover 208 is then rotated, from a first position in FIGS. 13 and 13A to a second position in FIGS. 14 and 14A, such that the screws 302 enter second, narrow portions 296B of the keyhole slots 296. Preferably, the narrow portions 296B are sized such that there is an interference fit between the narrow portions 296B and the screws 302 to secure the first cover 208 to the vehicle wheel 200. The screws 302 may then be tightened against the wheel disc 204 to further secure the first cover 208 to the vehicle wheel 200.

Figure 15:
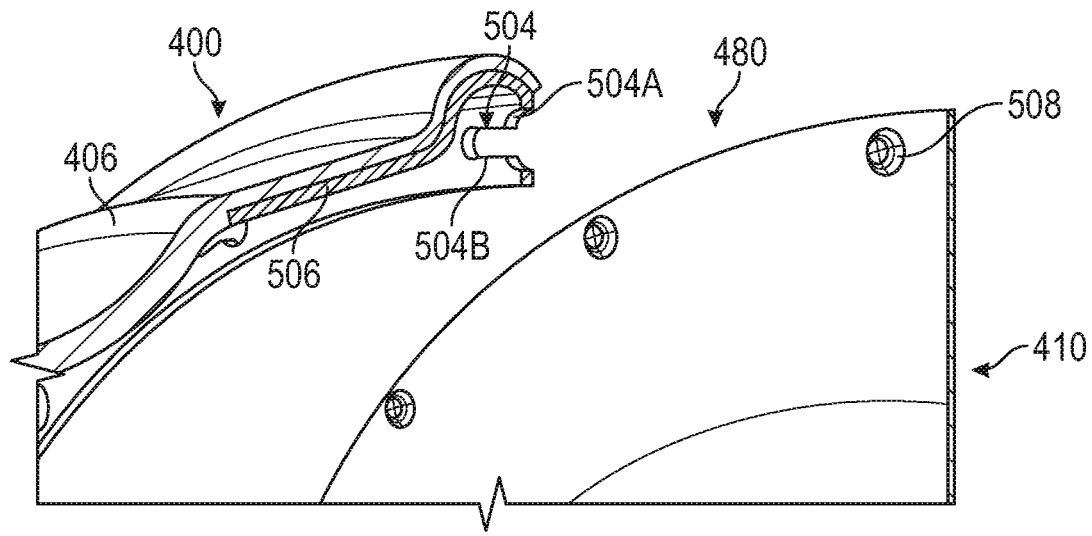
FIG. 15 is a first partial section view through a vehicle wheel in accordance with a third embodiment of the present invention.
Figure 16:
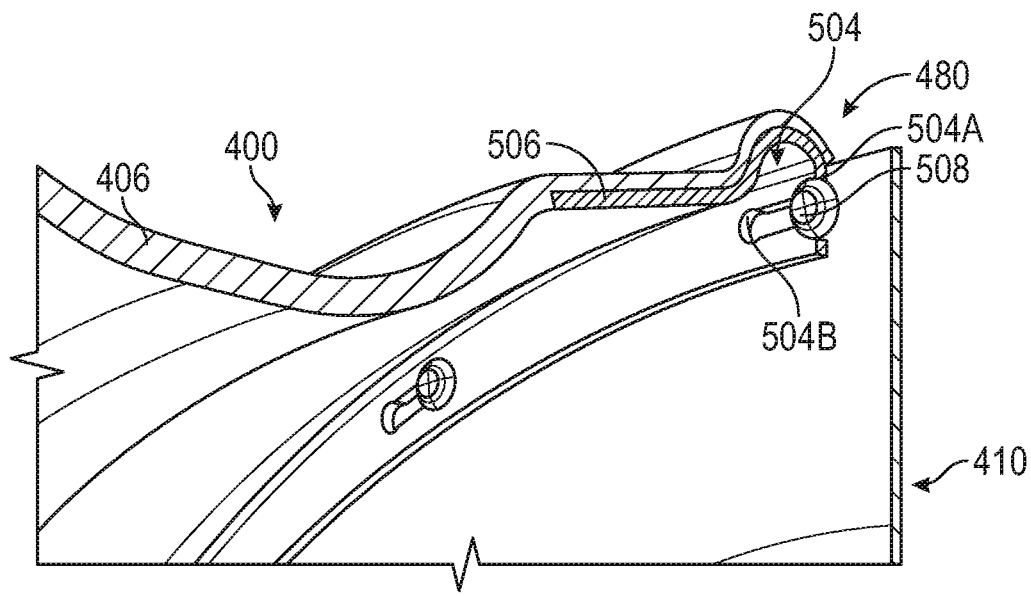
FIG. 16 is a second partial section view through the vehicle wheel of FIG. 15.

Referring now to FIGS. 15 and 16, there is illustrated a vehicle wheel, indicated generally at 400, in accordance with a third embodiment of the present invention. The vehicle wheel 400 is a variation of the vehicle wheel 100. As such, like reference numerals, increased by 300, designate corresponding parts in the drawings and detailed description thereof will be omitted.

The vehicle wheel 400 has a second attachment system, indicated generally at 480, in the form of an interlocking connection between the wheel rim 406 and the second cover 410. Slots, indicated generally at 504, are defined at a wheel rim 406. As illustrated, the slots 504 are keyhole slots. Alternatively, the slots 504 may be other than keyhole slots. The keyhole slots 504 are specifically defined in a lip portion 486 of the wheel rim 406. As illustrated, the keyhole slots 504 are defined in an insert 506 that is fixed or otherwise attached to an inner or underside of the wheel rim 406. The insert 506 is preferably fixable to wheel rims of prior art vehicle wheels without extensive modification to the prior art vehicle wheels. Alternatively, the keyhole slots 504 may be defined directly in the lip portion 486 and the insert 506 omitted. The second cover 410 has studs 508 extending from an inner side of the second cover 410 facing the vehicle wheel 400. Preferably, the studs 508 extend parallel to a wheel axis (not shown) and are formed integrally with the second cover 410. Alternatively, the studs 508 may be separately formed and installed on the second cover 410. As a non-limiting example, screws may be used in lieu of the illustrated studs 508.

The second cover 410 is preferably installed on the vehicle wheel 400 by first positioning the second cover 410 on the vehicle wheel 400 such that the studs 508 enter first, wide portions 504A of the keyhole slots 504. The first cover 408 is then rotated such that the studs 508 enter second, narrow portions 504B of the keyhole slots 504. Preferably, the narrow portions 504B are sized such that there is an interference fit between the narrow portions 504B and the studs 508 to secure the second cover 410 to the vehicle wheel 400.

Figure 17:
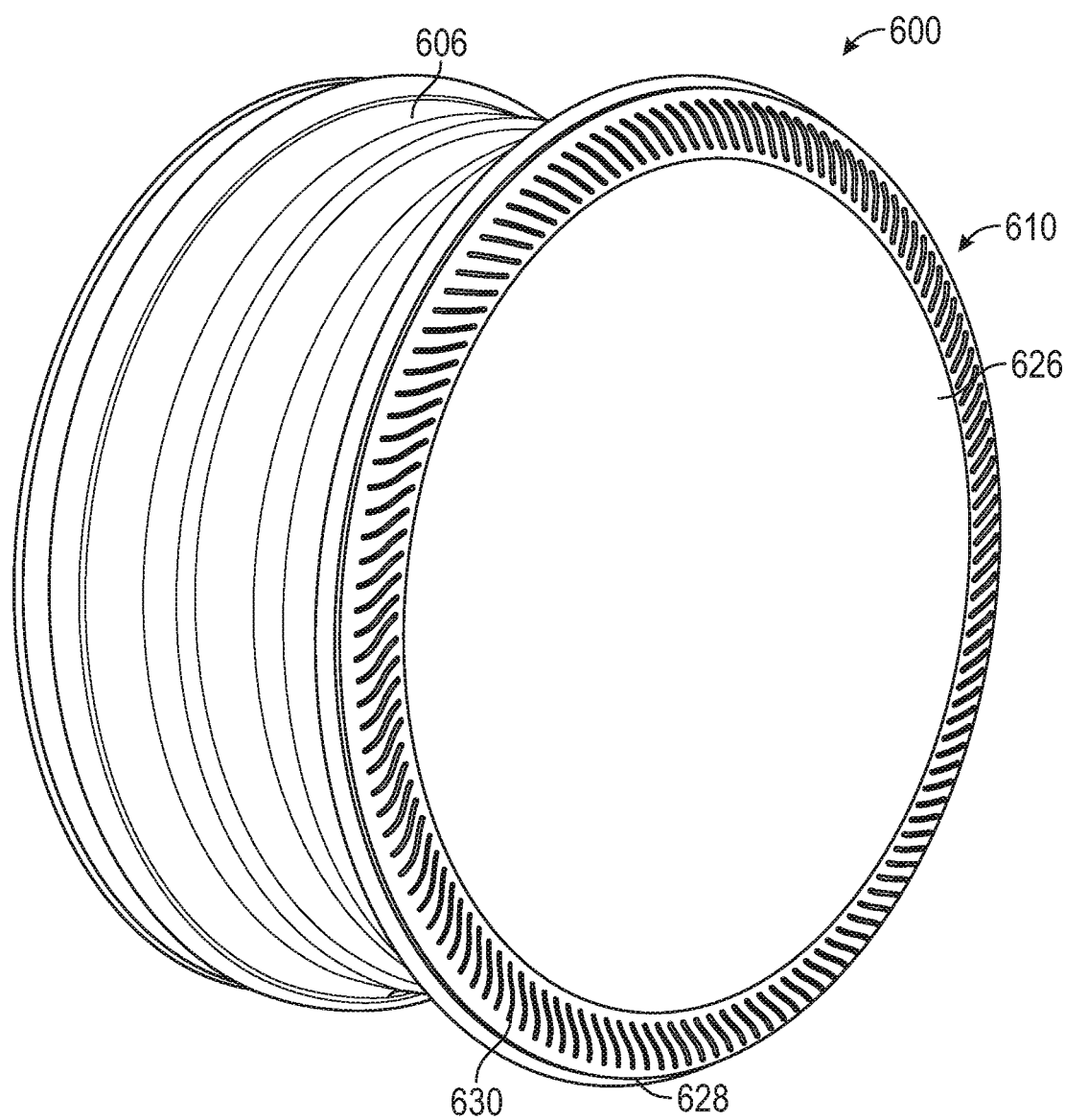
FIG. 17 is a partial perspective view of a vehicle wheel in accordance with a fourth embodiment of the present invention.
Figure 18:
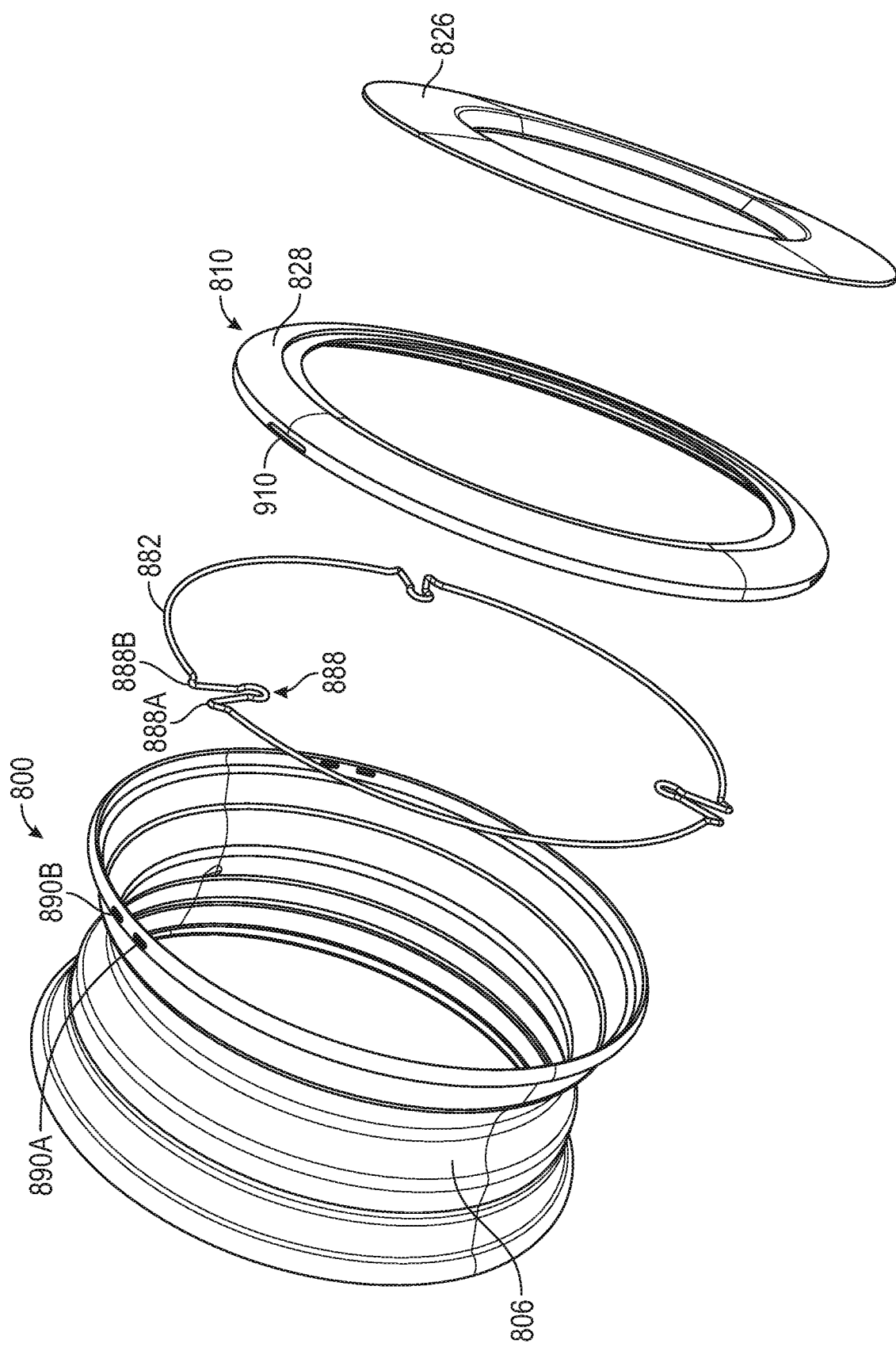
FIG. 18 is an exploded perspective view of a vehicle wheel in accordance with a fifth embodiment of the present invention.
Figure 19:
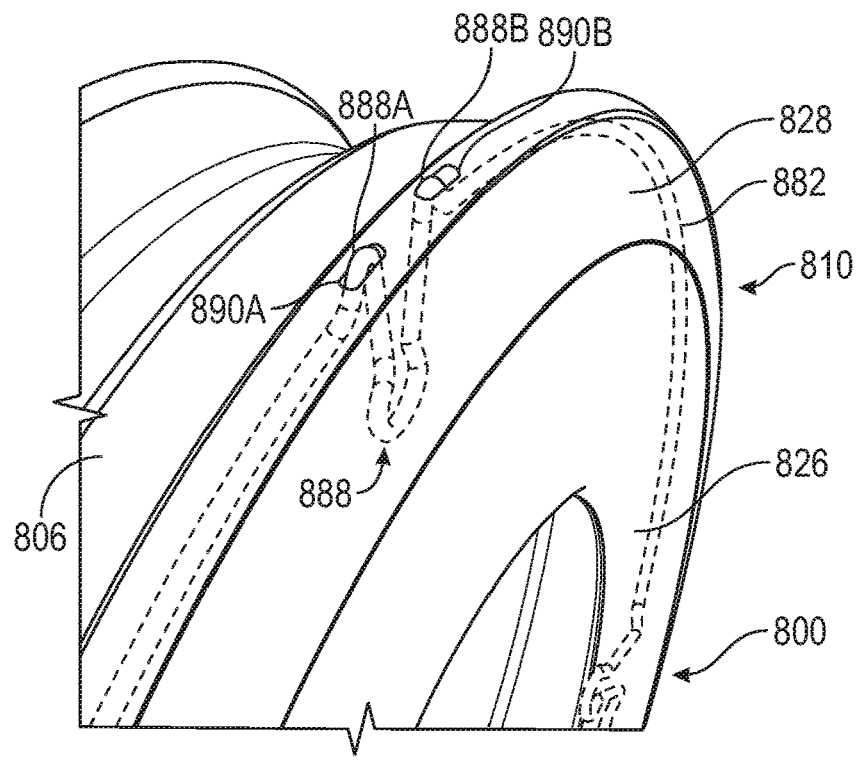
FIG. 19 is a partial perspective view of the vehicle wheel of FIG. 18.

Referring now to FIG. 17, there is illustrated a vehicle wheel, indicated generally at 600, in accordance with a fourth embodiment of the present invention. The vehicle wheel 600 is a variation of the vehicle wheel 100. As such, like reference numerals, increased by 500, designate corresponding parts in the drawings and detailed description thereof will be omitted.

The vehicle wheel 600 has a second cover 610. The second cover 610 has vents 630 but is otherwise a full cover. The second cover 610 does not have an opening such as the opening 132 in the second cover 110 shown in FIG. 4.

Referring now to FIGS. 18-22B, there is illustrated a vehicle wheel, indicated generally at 800, in accordance with a fifth embodiment of the present invention. The vehicle wheel 800 is a variation of the vehicle wheel 100. As such, like reference numerals, increased by 700, designate corresponding parts in the drawings and detailed description thereof will be omitted.

The vehicle wheel 800 has a second attachment system, indicated generally at 880. The second attachment system 880 has a compression portion, indicated generally at 888. As illustrated, the compression portion 888 has a V-shape with first and second "peaks" or radial portions 888A and 888B, respectively. The vehicle wheel 800 further has a wheel rim 806 with pairs of first and second through slots 890A and 890B, respectively. The first and second through slots 890A and 890B, respectively, correspond to first and second peaks 888A and 888B, respectively, of the compression portion 888. A second annular portion 828 of a second cover 810 includes through slots 910.

Figure 20:
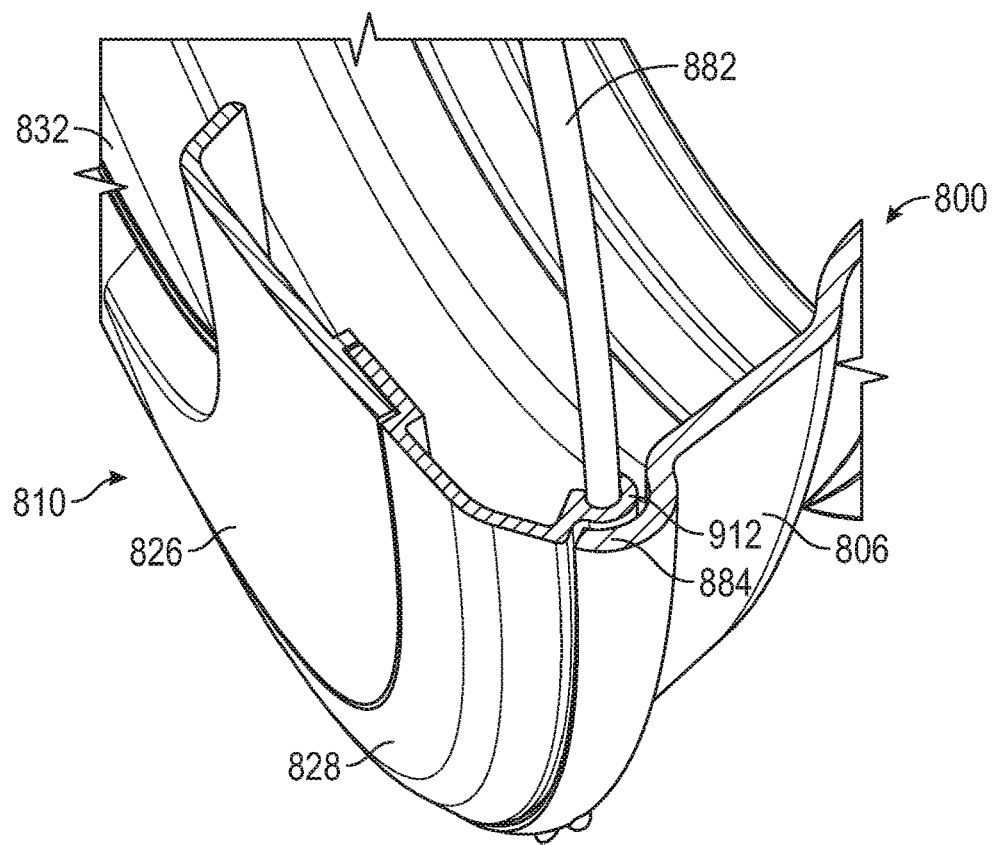
FIG. 20 is a partial section view of the vehicle wheel of FIG. 18.
Figure 21:
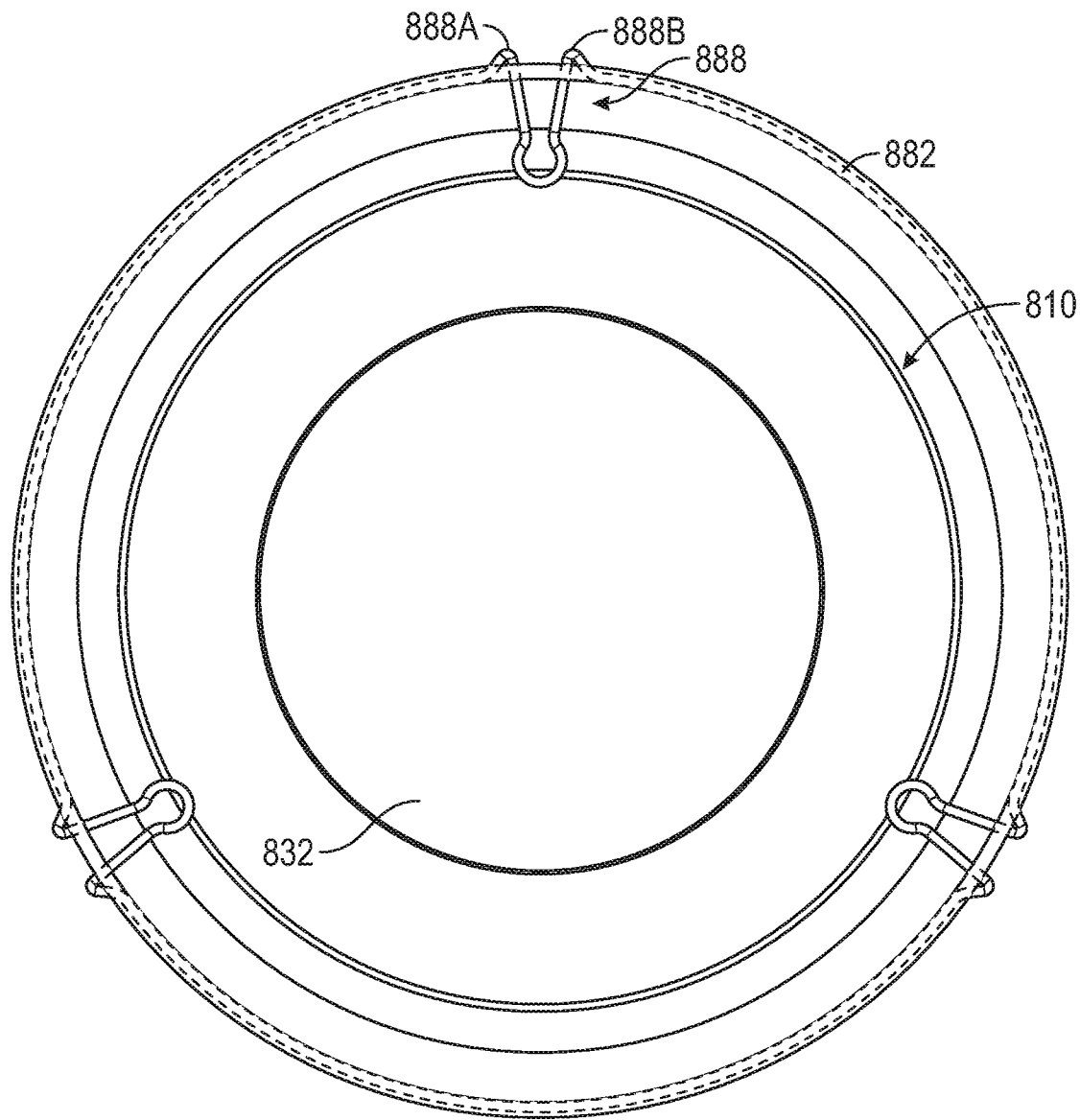
FIG. 21 is an elevation view of a second cover of the vehicle wheel of FIG. 18.
Figure 22A:
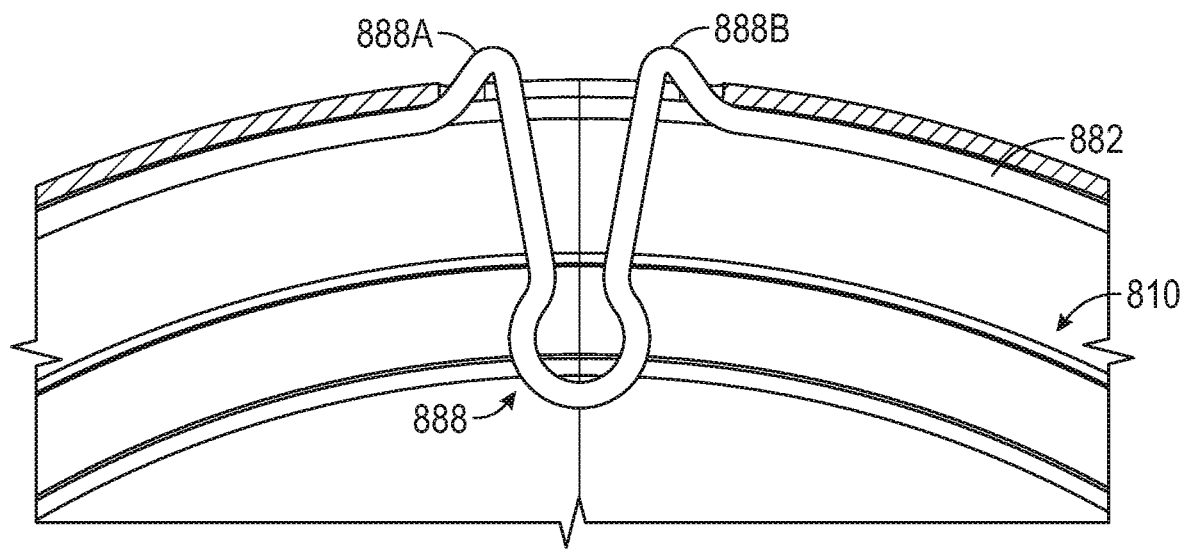
FIGS. 22A and 22B are partial elevation views of the vehicle wheel of FIG. 18.
Figure 22B:
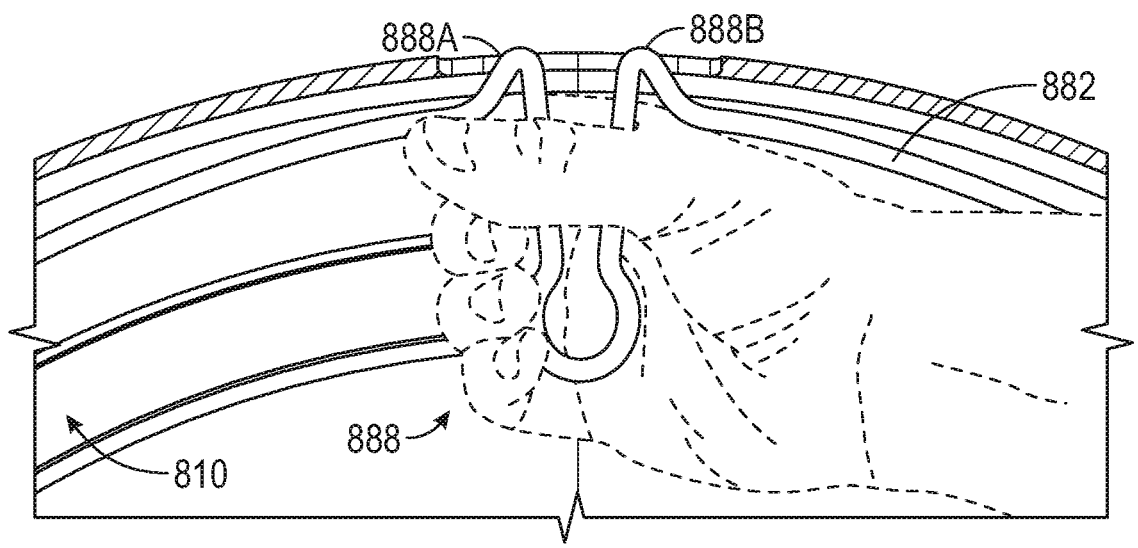

As shown in FIG. 20, a spring ring 882 is preferably retained within a bead portion 912 of the second cover 810. As illustrated, the spring ring 882 is retained within the bead portion 862 by the second cover 810 wrapping around or otherwise enclosing the spring ring 882. Alternatively, the spring ring 882 may be retained within the bead portion 862 other than as illustrated.

During attachment of the second cover 810 to the vehicle wheel 800, the compression portion 888 is compressed from a release position shown in FIG. 15A to a compression position shown in FIG. 15B. Specifically, the first and second peaks 888A and 888B, respectively, are displaced towards each other. Preferably, and as shown in FIG. 15B, the first and second peaks 888A and 888B, respectively, are manually displaced towards each other. The first and second peaks 888A and 888B, respectively, are first inserted through the cover slots 910. Then, the first peak 888A is inserted in the first through slot 890A and the second peak 888B is inserted in the second through slot 890B. The compression portion 888 is then released from the compression position to the release position and the second cover 810 is secured to the vehicle wheel 800.

Figure 23:
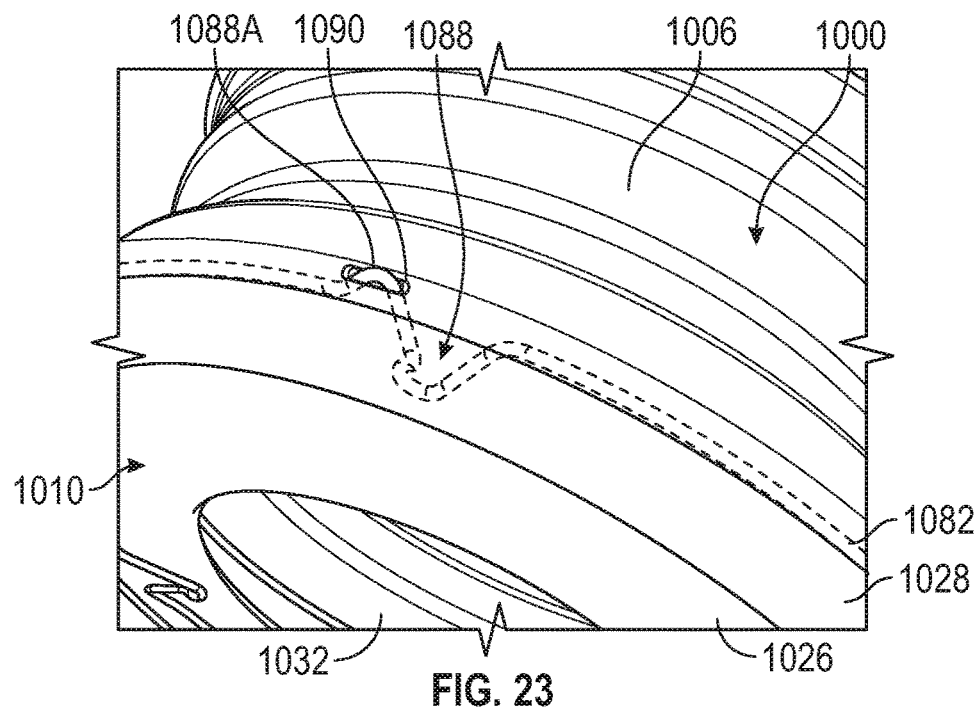
FIG. 23 is a partial perspective view of a vehicle wheel in accordance with a sixth embodiment of the present invention.
Figure 24:
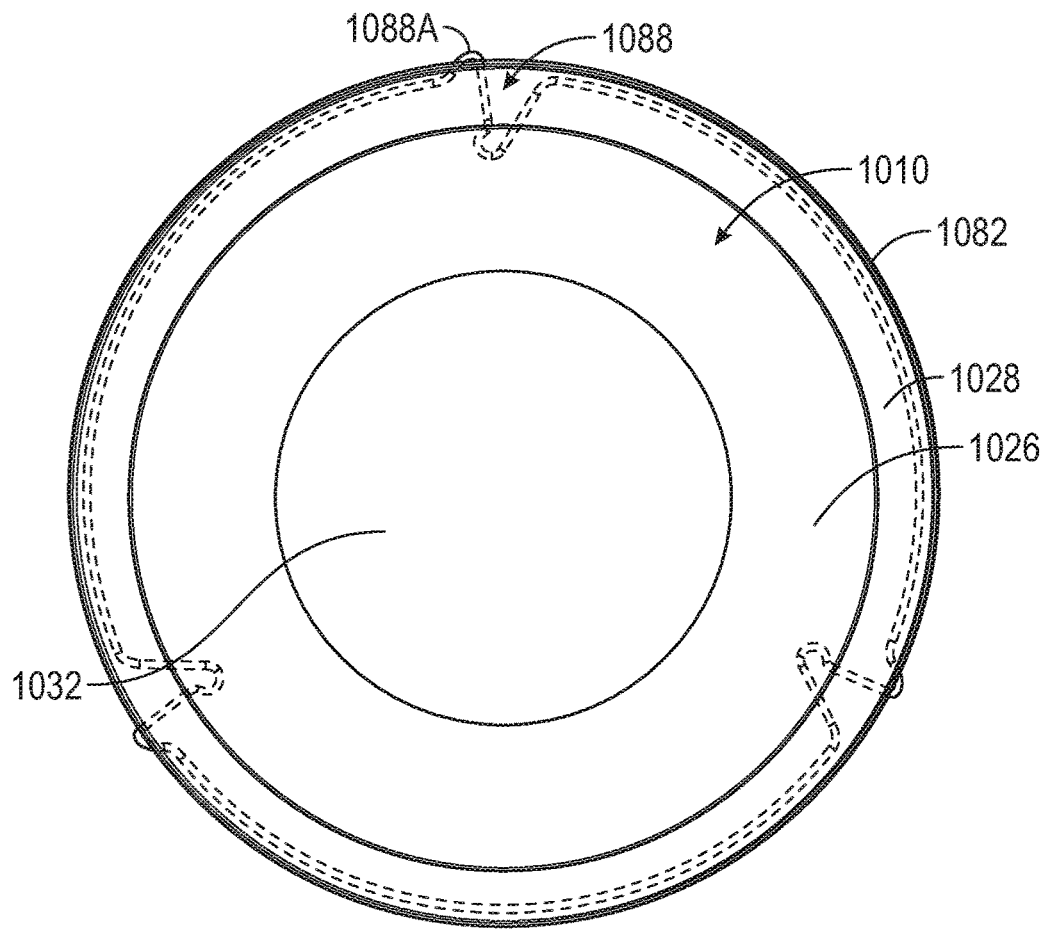
FIG. 24 is an elevation view of the vehicle wheel of FIG. 23.

Referring now to FIGS. 23 and 24, there is illustrated a vehicle wheel, indicated generally at 1000, in accordance with a sixth embodiment of the present invention. The vehicle wheel 1000 is a variation of the vehicle wheel 100. As such, like reference numerals, increased by 900, designate corresponding parts in the drawings and detailed description thereof will be omitted.

A compression portion 1088 has a single peak 1088A and a wheel rim 1006 has a single through slot 1090.

The principle and mode of operation of this invention have been described in its various embodiments. However, it should be noted that this invention may be practiced otherwise than as specifically illustrated and described without departing from its scope.

The invention claimed is:

1. A vehicle wheel and cover assembly comprising:
a vehicle wheel defining an axis and having an outboard side and an inboard side, the vehicle wheel including a wheel rim and a wheel disc secured together, the wheel disc including a plurality of lug bolt mounting holes configured to receive lug bolts and lug nuts to secure the vehicle wheel to a vehicle;
a first cover and a first cover attachment system configured to secure the first cover to the outboard side of the vehicle wheel;
wherein the wheel cover includes at least two annular adjoining portions and having a central opening formed therein; and
the first cover attachment system including a ring having an annular first portion and an annular second portion, the first portion extending generally perpendicular to the wheel axis and the second portion extending generally parallel to the wheel axis, the first portion including a plurality of openings formed therein configured to receive the lug bolts, the lug bolts configured to receive lug nuts to removably secure the first portion to the vehicle, the first cover having a groove portion formed therein configured to be removably secured to the second portion in combination with an associated threaded fastener installed in the first cover and extending through a slotted opening in the second portion.

2. The vehicle wheel and cover assembly of claim 1 wherein the first cover includes a plurality of air vents arrayed circumferentially about the first cover in an outer axially extending portion thereof.

3. The vehicle wheel and cover assembly of claim 1 wherein the first cover has a greater extent in a radial direction perpendicular to the wheel axis than in an axial direction parallel to the wheel axis.

4. The vehicle wheel and cover assembly of claim 1 wherein the first cover is a single integral part formed of a plastic material.

5. The vehicle wheel and cover assembly of claim 1 wherein when the first cover is secured to the wheel via the first attachment system, the first cover conceals the ring, the lug bolts and the lug nuts.

6. The vehicle wheel and cover assembly of claim 1 wherein the first cover includes an outer portion which is configured to be removably received in an inner lip portion of the wheel rim of the wheel.

7. The vehicle wheel and cover assembly of claim 1 wherein each of the slotted openings has an axial portion and a circumferential portion.

8. The vehicle wheel and cover assembly of claim 1 further comprising a second cover and second attachment system configured to removably secure the second cover to the inboard side of the wheel.

9. The vehicle wheel and cover assembly of claim 8 wherein the second attachment system includes a spring ring configure to compress an annular flange portion of the second cover against an annular inner lip portion of the wheel rim of the wheel.

10. The vehicle wheel and cover assembly of claim 9 wherein the spring ring is retained within a bead portion of the cover.

11. The vehicle wheel and cover assembly of claim 8 wherein the second cover includes a plurality of air vents circumferentially arrayed about the second cover.

12. The vehicle wheel and cover assembly of claim 8 wherein the second cover includes a central opening formed therein.

13. A vehicle wheel and cover assembly comprising:
a vehicle wheel defining an axis and having an outboard side and an inboard side, the vehicle wheel including a wheel rim and a wheel disc secured together, the wheel disc including a plurality of lug bolt mounting holes configured to receive lug bolts and lug nuts to secure the vehicle wheel to a vehicle;
a first plastic cover and a first cover attachment system configured to secure the first cover to the outboard side of the vehicle wheel;
wherein the first cover includes at least two annular adjoining portions and having a central opening formed therein; and
the first cover attachment system including a ring having an annular first portion and an annular second portion, the first portion extending generally perpendicular to the wheel axis and the second portion extending generally parallel to the wheel axis, the first portion including a plurality of openings formed therein configured to receive the lug bolts, the lug bolts configured to receive the lug nuts to removably secure the first portion to the vehicle, the first cover having a groove portion formed therein configured to be removably secured to the second portion in combination with an associated threaded fastener installed in the first cover and extending through a slotted opening in the second portion; and
a second plastic cover and second attachment system configured to removably secure the second cover to the inboard side of the wheel.

14. The vehicle wheel and cover assembly of claim 13 wherein the first cover includes a plurality of air vents arrayed circumferentially about the first cover in an outer axially extending portion thereof.

15. The vehicle wheel and cover assembly of claim 13 wherein the first cover has a greater extent in a radial direction perpendicular to the wheel axis than in an axial direction parallel to the wheel axis.

16. The vehicle wheel and cover assembly of claim 13 wherein when the first cover is secured to the wheel via the first attachment system, the first cover conceals the ring, the lug bolts and the lug nuts.

17. The vehicle wheel and cover assembly of claim 13 wherein the first cover includes an outer portion which is configured to be removably received in an inner lip portion of the wheel rim of the wheel.

18. The vehicle wheel and cover assembly of claim 13 wherein each of the slotted openings has an axial portion and a circumferential portion.

19. The vehicle wheel and cover assembly of claim 13 wherein the second attachment system includes a spring ring configure to compress an annular flange portion of the second cover against an annular inner lip portion of the wheel rim of the wheel.

20. The vehicle wheel and cover assembly of claim 13 wherein the second cover includes a plurality of air vents circumferentially arrayed about the second cover and a central opening formed therein.

* * * * *